US010023715B2

(12) United States Patent
Hata et al.

(10) Patent No.: US 10,023,715 B2
(45) Date of Patent: Jul. 17, 2018

(54) ELASTOMER STRUCTURE CONTAINING CARBON NANOTUBES AND METHOD FOR PRODUCING THE SAME

(71) Applicant: NATIONAL INSTITUTE OF ADVANCED INDUSTRIAL SCIENCE AND TECHNOLOGY, Tokyo (JP)

(72) Inventors: Kenji Hata, Ibaraki (JP); Atsuko Sekiguchi, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 54 days.

(21) Appl. No.: 14/885,266

(22) Filed: Oct. 16, 2015

(65) Prior Publication Data

US 2016/0200892 A1  Jul. 14, 2016

Related U.S. Application Data

(63) Continuation of application No. PCT/JP2014/060683, filed on Apr. 15, 2014.

(30) Foreign Application Priority Data

Apr. 16, 2013 (JP) ................................ 2013-085982

(51) Int. Cl.
    *C08K 3/04* (2006.01)
    *B29C 45/00* (2006.01)
    (Continued)

(52) U.S. Cl.
    CPC ............ *C08K 3/04* (2013.01); *B29C 45/0001* (2013.01); *B82Y 30/00* (2013.01); *C01B 32/174* (2017.08);
    (Continued)

(58) Field of Classification Search
    CPC ....... B82Y 30/00; C08J 5/005; C08J 2300/26; C08K 3/04; C08K 2003/045;
    (Continued)

(56) References Cited

U.S. PATENT DOCUMENTS 8,513,804 B2 * 8/2013 Hellstrom .............. B82Y 30/00
                                                      257/741
2009/0123731 A1  5/2009 Shimizu et al.
(Continued)

FOREIGN PATENT DOCUMENTS

JP    2007-237360 A    9/2007
JP    2008266577 A    11/2008
(Continued)

OTHER PUBLICATIONS

Machine Translation of WO 2012/060454 A1. (Year: 2012).*
(Continued)

*Primary Examiner* — Brian Handville
(74) *Attorney, Agent, or Firm* — Hauptman Ham, LLP

(57) ABSTRACT

Provided are: an elastomer structure containing carbon nanotubes; and a method for producing the elastomer structure. In a CNT elastomer having a mesh shaped carbon nanotube aggregate on a surface layer thereof, the mesh shaped carbon nanotube aggregate can impart a shape-retaining property to the elastomer. Therefore, the elastomer can be molded along the shape of a mold, and it becomes possible to mold a carbon nanotube elastomer having a fine dimension. The elastomer structure containing carbon nanotubes according to the present invention is provided with mesh shaped carbon nanotube aggregate which are embedded in a surface layer of the elastomer structure containing carbon nanotubes and are not protruded from the surface of the elastomer structure containing carbon nanotubes.

9 Claims, 21 Drawing Sheets

(51) Int. Cl.
  *B82Y 30/00* (2011.01)
  *C08J 3/215* (2006.01)
  *C01B 32/174* (2017.01)
  *B29K 507/04* (2006.01)
  *B29L 7/00* (2006.01)

(52) U.S. Cl.
  CPC ............... *C08J 3/215* (2013.01); *C08K 3/041* (2017.05); *B29K 2507/04* (2013.01); *B29L 2007/001* (2013.01); *C08J 2300/26* (2013.01); *C08J 2315/02* (2013.01); *C08K 2201/011* (2013.01)

(58) Field of Classification Search
  CPC ............... C08K 2201/011; C08L 21/00; B29C 45/0001; B29K 2507/04; B29L 2007/001
  See application file for complete search history.

(56) References Cited

U.S. PATENT DOCUMENTS

| | | | |
|---|---|---|---|
| 2010/0264376 A1 | 10/2010 | Korzhenko et al. | |
| 2012/0077033 A1* | 3/2012 | Shimada | B82Y 30/00 428/375 |
| 2013/0316160 A1 | 11/2013 | Hata et al. | |
| 2014/0217331 A1 | 8/2014 | Hata et al. | |
| 2014/0221533 A1 | 8/2014 | Hata et al. | |
| 2014/0291589 A1 | 10/2014 | Hata et al. | |

FOREIGN PATENT DOCUMENTS

| | | |
|---|---|---|
| JP | 2010-222582 A | 10/2010 |
| JP | 2010-228409 A | 10/2010 |
| WO | 2009102077 A1 | 8/2009 |
| WO | 2012060454 A1 | 5/2012 |
| WO | 2013/051707 A1 | 4/2013 |
| WO | 2013047796 A1 | 4/2013 |
| WO | 2013031958 A1 | 3/2015 |

OTHER PUBLICATIONS

English Translation of International Search Report dated May 27, 2014 regarding PCT application No. PCT/JP2014/060683.

English Translation of Written opinion of the International Search Authority dated May 27, 2014 regarding PCT Application No. PCT/JP2014/060683.

Japanese Office Action dated May 17, 2016 for the counter Japanese application No. 2015-512481.

* cited by examiner

ELASTOMER STRUCTURE CONTAINING CARBON NANOTUBES AND METHOD FOR PRODUCING THE SAME

CROSS REFERENCE TO RELATED APPLICATIONS

This application is based upon and claims the benefit of priority from the prior Japanese Patent Application No. 2013-085982, filed on Apr. 16, 2013 and PCT Application No. PCT/JP2014/060683, filed on Apr. 15, 2014, the entire contents of which are incorporated herein by reference.

FIELD

The present invention is related to an elastomer structure containing carbon nanotubes and a manufacturing method thereof. In particular, the present invention is relate to an elastomer structure containing carbon nanotubes and a manufacturing method thereof in which fine processing of a predetermined pattern is performed on a surface of the elastomer.

BACKGROUND

Molding, compression molding and punching are conventionally known as methods for processing an elastomer such as rubber. In particular, when performing fine processing on the surface of a rubber, a predetermined pattern is formed by molding or compression molding. However, related to the conventional method, because a rubber base material includes flexibility and has no shape-retaining property, the more the pattern becomes fine, it may not be possible to maintain the pattern shape when peeled from a mold, the microstructure becomes torn and processing of a rubber structure having a fine structure was practically impossible.

For example, a method of forming a nanoscale pattern is described in Japanese Laid Open Patent 2007-237360 in which a piece to be processed using a material that is elastically deformable is elastically deformed in an orthogonal direction of the processing surface, an uneven pattern is formed by lithography or the like, and the piece to be processed is returned to a normal state before elastic deformation. However, the aspect ratio of the pattern shown in Japanese Laid Open Patent 2007-237360 is at most 1, and the manufactured structure by photolithography is troublesome which is not practical.

SUMMARY

The present invention has been made to solve the problems of the conventional prior art described above by providing shape retention properties to an elastomer structure in which an elastomer has been molded and which it is possible to mold the shape of elastomer along the shape of the mold to mold an elastomer having fine dimensions. The present invention provides an elastomer structure containing carbon nanotubes and a method of manufacturing the same.

In the present invention, a mesh shaped carbon nanotube aggregate (CNT aggregate) provides shape retention properties to an elastomer by molding a carbon nanotube elastomer containing the mesh shaped carbon nanotube aggregate in a surface layer and it possible to mold process the elastomer along the shape of the mold to mold a carbon nanotube elastomer having fine dimensions.

According to one embodiment of the present invention, there is provided an elastomer structure containing carbon nanotubes including a mesh shaped carbon nanotube aggregate embedded in a surface layer of the elastomer structure containing nanotubes and not protruding from a surface.

In the elastomer structure containing carbon nanotubes, the mesh shaped carbon nanotube aggregate may be locally and unevenly dispersed in the surface layer.

In the elastomer structure containing carbon nanotubes, the mesh shaped carbon nanotube aggregate dispersed locally and unevenly in the surface layer may uniformly cover the entire surface layer.

In the elastomer structure containing carbon nanotubes, the carbon nanotube aggregate may cover 50% or more of the elastomer structure containing carbon nanotubes.

In the elastomer structure containing carbon nanotubes, the elastomer structure containing carbon nanotubes may be formed by transferring in a shape of a mold.

An elastomer structure containing carbon nanotubes includes a shape defined by dimensions of 500 µm or less.

In the elastomer structure containing carbon nanotubes, the dimension may be a ridge line.

In the elastomer structure containing carbon nanotubes, the dimension may be a width.

In the elastomer structure containing carbon nanotubes, the dimension may be a height.

In the elastomer structure containing carbon nanotubes, the dimension may be an arc and/or a curvature of a curved surface.

According to one embodiment of the present invention, a method of manufacturing an elastomer structure containing carbon nanotubes includes preparing a carbon nanotube/rubber composite material containing carbon nanotubes, adding pressure to the carbon nanotube/elastomer composite material at a temperature softening an elastomer and pressing the carbon nanotube/elastomer composite material into a mold, and bringing out the carbon nanotube/elastomer composite material from the mold.

In the method of manufacturing the elastomer structure containing carbon nanotubes, the carbon nanotube/rubber composite material may be prepared by manufacturing the carbon nanotube/elastomer containing carbon nanotubes.

In the method of manufacturing the elastomer structure containing carbon nanotubes, the mold may be arranged with a recessed part of a certain shape of 10 µm or more and 100 µm or less.

BRIEF DESCRIPTION OF THE DRAWINGS

FIG. 1A is a schematic view of the elastomer structure 100 containing CNTs including an elastomer structure 130 containing CNTs of a surface layer arranged above a base 110;

FIG. 1B shows a part of the elastomer structure 100 containing CNTs cut along the line AA' in (a) to expose the interior;

REFERENCE SYMBOLS

10: CNT, 13: mesh body, 15: trunk part, 17: connecting part, 30: elastomer, 100: elastomer structure containing CNTs, 110: base, 111: CNT aggregate, 113: CNT aggregate, and 130: elastomer structure containing CNTs

EMBODIMENTS

In an elastomer structure containing carbon nanotubes related to the present invention (hereinafter, referred to as elastomer structure containing CNTs), a mesh shaped carbon nanotube aggregate (CNT aggregate) provides shape retaining properties to the elastomer by molding the CNT elastomer arranged with the mesh shaped carbon nanotube aggregate in a surface layer, and the elastomer structure containing carbon nanotubes is obtained by molding the elastomer along the shape of the mold. The elastomer structure containing CNTs related to the present invention is an elastomer structure not present in the prior art in which a micrometer order structure is molded along the shape of a mold and it is possible to maintain the shape even when peeled from the mold.

Figure 1A:
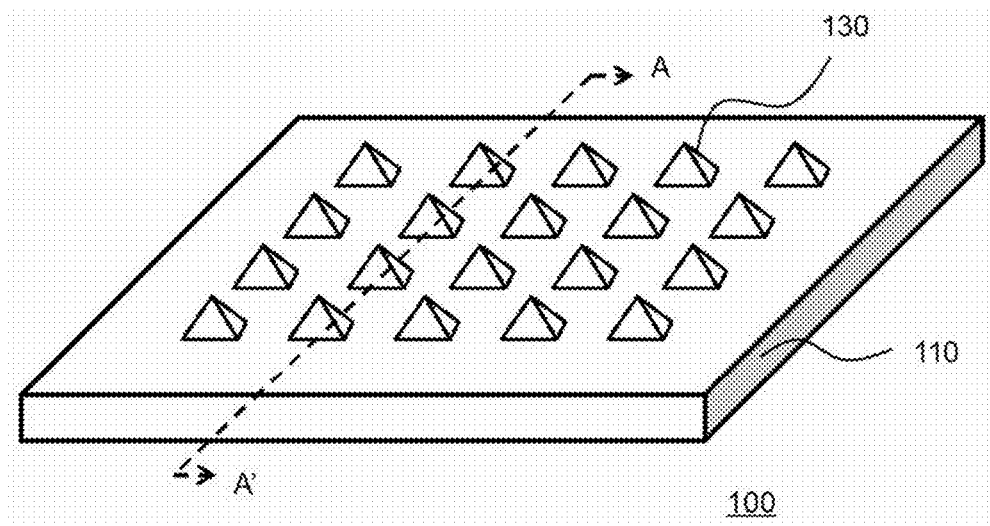
FIG. 1A is a schematic diagram of an elastomer structure 100 containing CNTs related to one embodiment of the present invention.
Figure 1B:
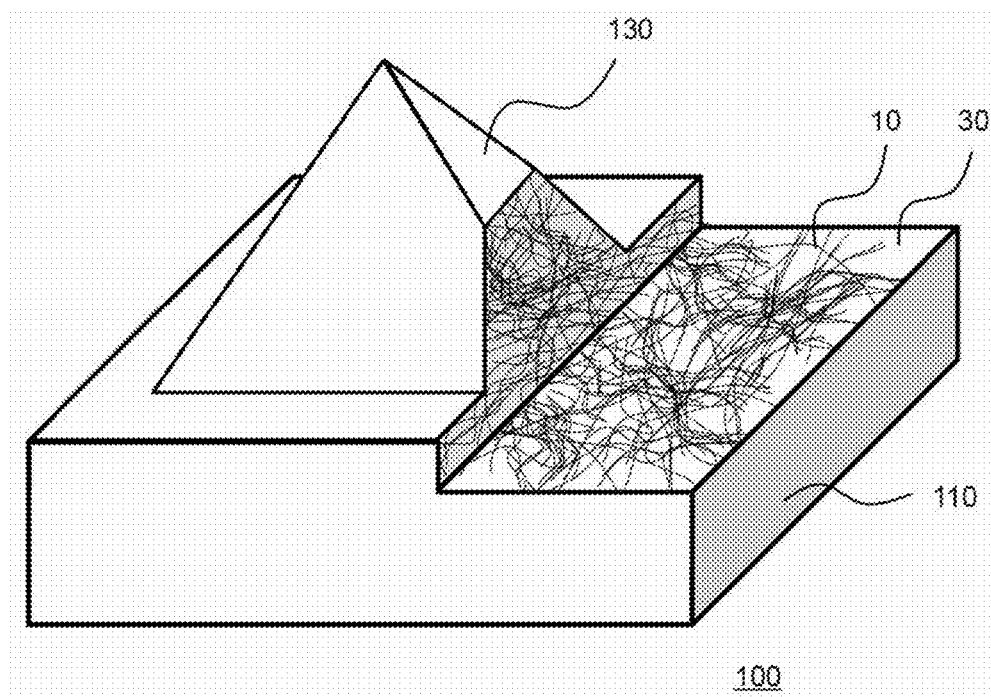
FIG. 1B is a schematic diagram of an elastomer structure 100 containing CNTs related to one embodiment of the present invention.

FIG. 1 is a schematic diagram of an elastomer structure containing CNTs 100 related to one embodiment of the present invention, FIG. 1A is a schematic diagram of an elastomer structure containing CNTs 100 arranged with an elastomer structure containing CNTs 130 of a surface layer arranged on a base 110, and FIG. 1B shows a part of the elastomer structure 100 containing CNTs cut along the line AA' in FIG. 1A to expose the interior. In the elastomer structure containing CNTs 100, CNTs 10 are dispersed in the elastomer 30. In FIG. 1, although the elastomer structure containing CNTs 130 arranged on the base 110 is shown as an example, an "elastomer structure containing carbon nanotubes" in the present specification refers to the structure 130 with a predetermined shape arranged on the base 110 and also in a broad sense refers to the entire elastomer structure containing CNTs 100 arranged with the structure 130 of the surface layer of a predetermined shape arranged on the base 110.

In addition, the "elastomeric structure containing carbon nanotubes" in the present specification is a structure in which a composite material containing CNTs and an elastomer is molded and is not limited to the structure and shape are not particularly limited and is defined by the shape of the mold used for molding. Therefore, it is preferred that the elastomeric structure containing CNTs 100 is formed by transferring a shape of the mold. In particular, the elastomer structure containing CNTs 100 preferably comprises a shape defined by micrometer order fine dimensions.

As shown in FIG. 1 (b), the elastomer structure containing CNTs 100 comprises a mesh shaped CNT aggregate embedded in the surface layer of the elastomer structure containing CNTs 100 and the mesh shaped CNT aggregate does not protrude from the surface. The elastomer structure containing CNTs 100, in at least the structure 130 of the surface layer is preferred to contain 0.5 wt % or more of CNTs 10, preferably 1 wt % or more, and more preferably 2 wt % or more. The elastomer structure containing CNTs 100 containing CNTs 10 of at such a contained amount, and/or the structure 130 of the surface layer has a shape maintaining property, and it is possible to mold the elastomer containing CNTs to the shape of the molded body having micrometer order fine dimensions.

When likening the elastomer structure containing CNTs 100 to a building, the CNTs 10 correspond to the rebar of the building of reinforced concrete, and the elastomer 30 corresponds to the concrete. That is, although soft precise molding is difficult just with concrete (elastomer 30), by arranging a rebar (CNTs 10) therein, shape retention properties are improved and is similar to precision manufacturing becoming possible.

In one embodiment, the elastomer structure containing CNTs 100 has contained water content of 5% or less, preferably 1% or less, more preferably 0.5% or less, an even more preferably 0.2% or less, and still more preferably 0.1% or less and more preferably 0.01% or less. When the water content is large, bubbles are generated during the heating or the like when manufacturing an elastomer structure containing CNTs and precision molding becomes difficult.

(Measurement of Water Content)

The water content of the elastomer structure containing CNTs 100 related to the present invention can be measured by a Karl Fischer reaction. After drying a CNT aggregate under predetermined conditions (under vacuum, 1 hour holding time at 200° C.), the vacuum is removed and 30 g of the CNT aggregate is brought out in a glove box of dry nitrogen gas stream and moved to a glass boat of the water measurer. The glass boat is moved to a vaporizer and heated at 150° C.×2 minutes, the water vaporized during this time is carried by nitrogen gas and reacts with iodine by next Karl Fischer reaction. The water content is detected by the electrical quantity required for generating iodine equal to an amount of iodine consumed at this time.

The elastomer structure containing CNTs 100 is preferably elastically deformed. Here, elastic deformation means the elastomer structure containing CNTs 100 returns to an original state when strains are relaxed without being broken even when strain is applied. In one embodiment, elastically deformation is preferred at a 10% elongation, and more preferably 20% elongation, and even more preferably at 30% elongation. The elastomer structure containing CNTs 100 that is elastically deformed is possible so as to provide the CNTs 10 with flexibility. In addition, in the elastomer structure containing CNTs 100, the CNTs 10 form a mesh shaped CNT aggregate. This is described in detail below.

In the present invention, the structure 130 of a surface layer comprised in the elastomer structure containing CNTs 100 may be formed on the surface of the base 110 and may protrude or be depressed on the surface of the base 110. In addition, the structure 130 of the surface layer may be arranged on the surface of the base 110. Therefore, in the elastomer structure containing CNTs 100, the shape and arrangement of the structure 130 of the surface layer is not particularly limited and can take various forms.

(Dimensions)

In addition, the elastomer structure containing CNTs 100 according to the present embodiment has a shape defined by the dimensions of 500 µm or less, preferably 200 µm or less, more preferably 150 µm or less, more preferably 100 µm or less, more preferably 75 µm or less, and most preferably 50 µm or less. The dimensions defined here may be either a ridge, width, height, arc, the curvature of a curved surface or length of a side of the structure 130 of the surface layer, and may be defined by a combination of two or more dimensions. Conventionally, the structure of the surface layer having such a shape cannot maintain a pattern shape or a fine structure becomes torn when peeled from a mold, and processing of a rubber structure having a fine structure was virtually impossible. The elastomer structure containing CNTs 100 having the above-described fine dimensions is realized by the present invention for the first time.

(Mesh Shaped CNT Aggregate)

Figure 2:
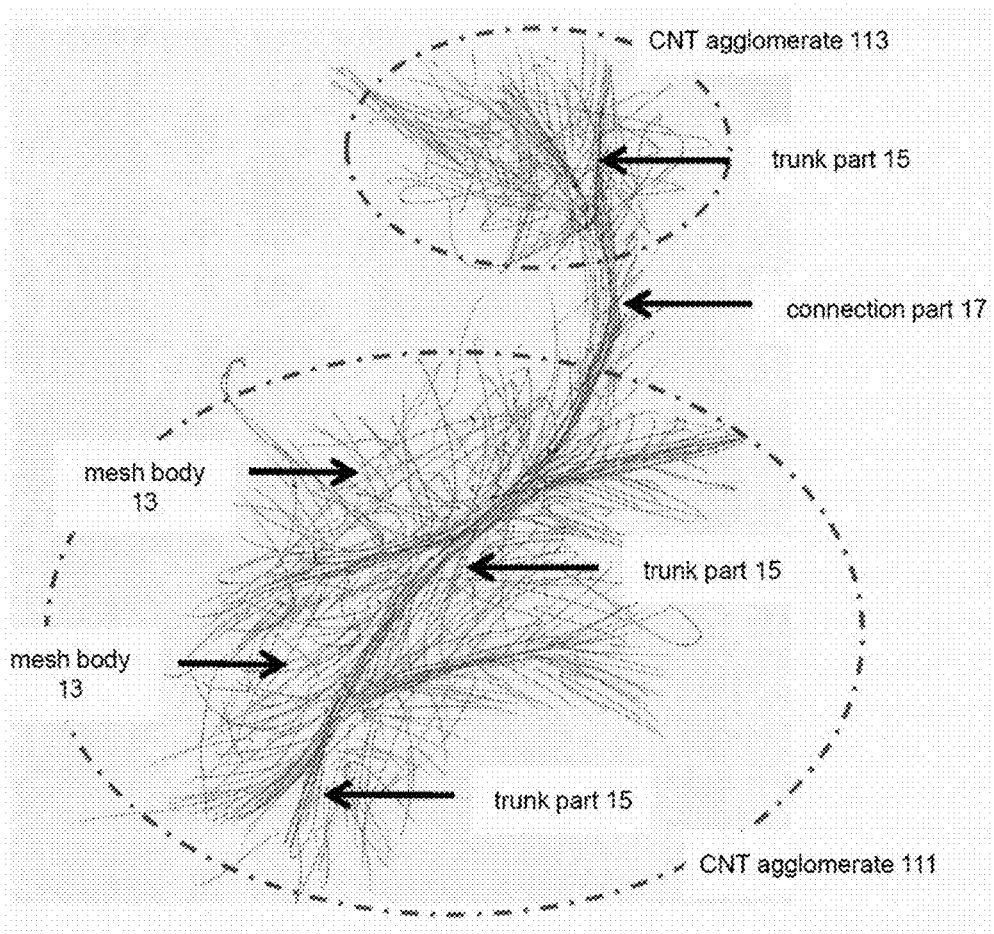
FIG. 2 is a schematic diagram of CNT10 related to an embodiment of the present invention.
Figure 3:
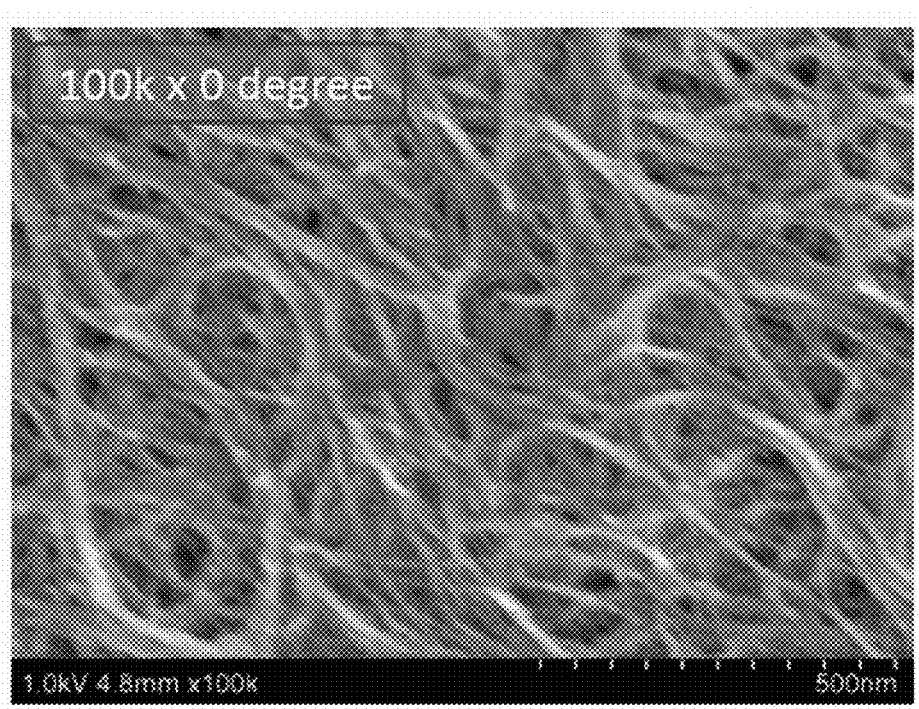
FIG. 3 is a scanning electron microscope image showing a mesh body of CNT10 related to an embodiment of the present invention.
Figure 4:
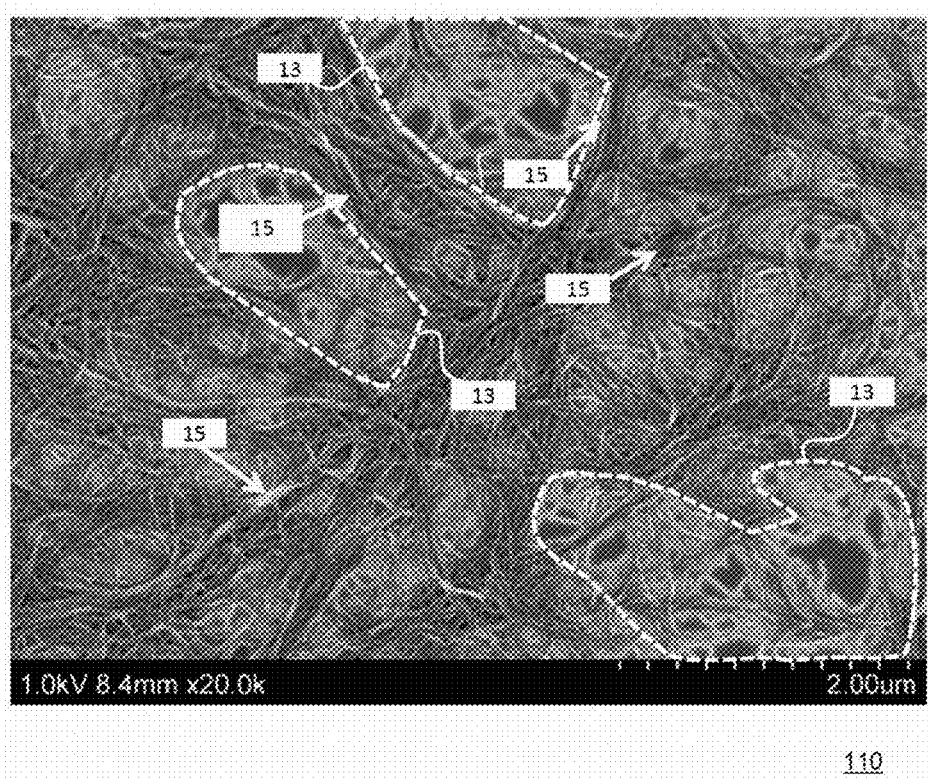
FIG. 4 is a scanning electron microscope image showing a mesh body of CNT10 related to an embodiment of the present invention.

A reason for being able to form the structure 130 of the fine surface layer in this way using a material including rubber is for the CNTs 10 forming a mesh shaped CNT aggregate in the elastomer structure containing CNTs 100. FIG. 2 is a schematic diagram of CNTs 10 shown in FIG. 1(b). The CNTs 10 form a plurality of CNT aggregates 111 and 113 comprising a mesh body 13, a trunk part 15 and connection part 17 comprising the trunk part 15 and mesh body 13, and the trunk part 15 extends to the connection part 17. Here, a mesh body shows a network structure having a form such as non-woven comprising a CNT (or CNT bundle) and CNT (or CNT bundle) having fine pores (gaps) as shown in the scanning electron microscope (SEM) image in FIG. 3 and FIG. 4. Since a CNT aggregate having the mesh body 13 is appropriately unwound between CNTs (or between bundles of CNTs) and gaps which can be easily impregnated by the elastomer 30 exist between the CNTs (or between bundles of CNTs), the CNT aggregate having the mesh body 13 is considered to be superior in terms of dispersibility. Furthermore, it is preferred that the CNTs (or bundles CNTs) forming the mesh body 13 are substantially non-oriented.

In addition, since the elastomer structure containing CNTs 100 including the CNT aggregate arranged with a mesh body 13 by the CNT aggregate, not the elastomer structure containing CNTs 100 formed using single or isolated CNTs, is arranged with a very developed CNT network spread across to detailed areas in a broad area, there is an advantage in that CNTs can fully exhibit inherent properties. The elastomer structure containing CNTs 100 according to one embodiment of the present invention may include disjointed CNTs and a bundle of bundled of CNT within a range that does not impair the effects of the present invention as appropriate.

It is preferred that the CNT aggregate has a pore diameter in which a differential pore volume is maximum in the pore diameter range of 0.002 µm or more and 10.00 µm or less measured using a mercury intrusion method is within a range of 0.02 µm or more, more preferably 0.03 µm or more, more preferably 0.04 µm or more, and 2.0 µm or less, more preferably 1.5 µm or less, more preferably 1.0 µm or less, more preferably 0.7 µm or less, more preferably 0.5 µm or less. In addition, it is preferred that the pore volume at a pore diameter in which a differential pore volume is maximum is 0.5 mL/g or more, more preferably 0.6 mL/g or more, more preferably 0.7 mL/g or more, more preferably 0.8 mL/g or more. Although there is no particular upper limit of a suitable pore volume, the pore volume of a CNT aggregate is generally 20 mL/g or less, more preferably 10 mL/g or less, and more preferably 5 mL/g or less. Since this type of CNT aggregate having pores includes numerous appropriate gaps (pores) between the CNTs to form the mesh body 13, it is easy to impregnate the elastomer 30 between the CNTs and the surface of the CNTs is easy to contact. Therefore, mutual interaction of CNTs and the elastomer 30 is increased, CNTs are easily dispersed in the elastomer 30 and as a result, a CNT aggregate having this type of pore diameter is dispersed stably in the elastomer structure containing CNTs 100. Furthermore, in the pore diameter range of 0.002 µm or more and 10.00 µm or less, it is preferred that the pore diameter in which a differential pore volume is maximum is one (There is one peak of the differential pore volume). Since the CNT aggregate having such a differential pore volume has a uniform pore diameter, the CNT aggregate is easily dispersed in the elastomer structure containing CNTs 100.

Since it is difficult to suitably specify the CNT aggregate within the elastomer structure containing CNTs 100, the CNTs are brought out from the elastomer structure containing CNTs 100 that includes a CNT aggregate using the method described below and the CNT compact is evaluated, and the characteristics of the CNT aggregate are defined.

In the present invention, the mesh shaped CNT aggregate provides shape retention properties to the elastomer 30 so that a rebar structure supports a building, and thereby it is possible to mold the elastomer structure containing CNTs 100 into the shape of the molded body having fine dimensions. In addition, it is preferred that a CNT aggregate is embedded in the surface layer of the elastomer structure containing CNTs 100 and does not protrude from the surface of the elastomer structure containing CNTs 100, to mold the elastomer structure containing CNTs 100 into the shape of the molded body having fine dimensions.

(Surface Layer)

Here, the surface layer of the elastomer structure containing CNTs 100 is further explained. In the present invention, the "surface layer of the elastomer structure containing CNTs 100" refers to an area of thickness from the surface of the elastomer structure containing CNTs 130 arranged on the base 110 up to 10 µm, preferably up to 20 µm, more preferably 30 µm, even more preferably up to 50 µm, and most preferably up to 100 µm. It is preferable to arrange a mesh shaped CNT aggregate in this area. It is preferred that the mesh shaped CNT aggregate is dispersed locally and unevenly in a surface and/or surface layer in a range of 10 µm or less, preferably in the range of 5 µm or less. It is preferred that a mesh shaped CNT aggregate that is dispersed locally and unevenly in this way covers the whole surface layer and/or surface of the elastomer structure containing CNTs uniformly.

In one embodiment, a mesh shaped CNT aggregate covers 50% or more of the elastomer structure containing CNTs 130, preferably 60% or more, more preferably 70% or more, and more preferably 80% or more. Here, the coverage of the mesh shaped CNT aggregate can be obtained by separating an arbitrary part of the elastomer structure containing CNTs 130, observing the cross section of the surface layer using a SEM image at a magnification of 100,000 times and calculating the proportion of CNTs which take up the observed area. In this way, in the elastomer structure containing CNTs 130, when a mesh shaped CNT aggregate is dispersed and covers, the surface layer has a shape retention property, and it is possible to mold the elastomer structure containing CNTs in the shape of the molded body having fine dimensions.

In addition, the elastomer structure containing CNTs 100 according to the present embodiment has a surface arithmetic average roughness of 10 µm or less, preferably 8 µm of less, more preferably 5 µm or less, and most preferably 2 µm or less. Here, the arithmetic average roughness (Ra) of the surface can be determined by calculation on the basis of JISB0601-2001 from the actual measured values of an atomic force microscope (AFM). Arithmetic average roughness is represented by an average value by bringing out only the reference length l from a roughness curve in an average line direction and totaling the absolute value of the deviation from the average line of the brought out part to a measurement curve.

In addition, arithmetic average roughness of the surface of the elastomer structure containing CNTs 100 is the minimum dimension of the dimension defined by the elastomer structure containing CNTs 100 or less, preferably ½ or less, more preferably ⅓ or less and most preferably ⅕ or less.

The elastomer structure containing CNTs 100 with such a smooth surface can be molded with high precision and it is possible to define the shape with fine dimensions.

(Elastomer)

It is possible to use a known material which has excellent deformability as the elastomer 30 which can be utilized in the present invention. For example, from the viewpoint of flexibility, electrically conductivity and durability, for example, one or more can be selected from elastomers such as natural rubber (NR), epoxidized natural rubber (ENR), styrene-butadiene rubber (SBR), nitrile rubber (NBR), chloroprene rubber (CR), ethylene-propylene rubber (EPR, EPDM), butyl rubber (IIR), chlorobutyl rubber (CIIR), acrylic rubber (ACM), silicone rubber (Q), fluorocarbon rubber (FKM), butadiene rubber (BR), epoxidized butadiene rubber (EBR), epichlorohydrin rubber (CO, CEO), urethane rubber (U), polysulfide rubber (T), thermoplastic elastomers such as olefin-based (TPO), polyvinyl chloride-based (TPVC), polyester-based (TPEE), polyurethane-based (TPU), polyamide-based (TPEA), and styrene-based (SBS). In addition, the elastomer 30 may be a copolymer thereof, a modified product and a mixture of two or more. In particular, an elastomer with a high polarity which can easily produce free radicals when mixing the elastomer can be selected for example from one or more of a natural rubber (NR) and nitrile rubber (NBR). The elastomer used for the carbon nanotube composite of the present invention may be crosslinked with one or more kinds selected from the above groups. In one embodiment, since fluorocarbon rubber has a high dispersibility to CNTs and is deformed by following the mutual deformation of the CNTs, fluorocarbon rubber can be suitably used.

In addition, the present invention can also use resins. One or more selected from fluorocarbon resins other than a compound containing fluorine, for example, polyesters such as polyethylene terephthalate (PET), polybutylene terephthalate (PBT), polytrimethylene terephthalate (PTT), polyethylene naphthalate (PEN), and liquid crystal polyester, polyolefins such as polyethylene (PE), polypropylene (PP), and polybutylene, styrene-based resins, and other resins such as polyoxymethylene (POM), polyamide (PA), polycarbonate (PC), polymethylenemethacrylate (PMMA), polyvinyl chloride (PVC), polyphenylene sulfide (PPS), polyphenylene ether (PPE), modified PPE, polyimides (PI), polyamideimide (PAI), polyetherimide (PEI), polysulfone (PSU), polyethersulfone (PES), polyketone (PK), polyetherketone (PEK), polyether ether ketone (PEEK), polyether ketone ketone (PEKK), polyarylate (PAR), polyether nitrile (PEN), phenol resins, phenoxy resins, and polytetrafluoroethylene can be used.

Although the crosslinking agent is different depending on the type of the elastomer described above, for example, an isocyanate group containing crosslinker (isocyanate, blocked isocyanate, etc.), sulfur-containing crosslinking agent (such as sulfur), a peroxide cross-linking agent (peroxide, etc.), hydrosilyl group-containing cross-linking agent (hydrosilylation curing agent), urea resins such as melamine, epoxy curing agents, polyamine curing agents, light crosslinking agent or the like which generate a radical by energy such as ultraviolet light and an electron beam may be used. These may be used alone or two or more types may be used.

(CNT)

In the present invention, if the CNTs 10 have properties necessary to maintain the fine structure of the elastomer structure containing CNTs 100, it is possible to use a known CNT with a single layer, two layers, three layers or multilayers. The length of the CNTs 10 is 0.1 µm or more, more preferably 0.5 μm or more, still more preferably 1 μm or more. Since these CNTs 10 have excellent deformability and deform by following the deformation of the elastomer 30, excellent durability can be exhibited against repeated strain such as distortions.

The average diameter of the CNTs 10 is in the range of 1 nm or more and 30 nm or less, preferably in the range of 1 nm or more and 10 nm or less. When the average diameter is too small, agglomeration is too strong and the CNTs are not dispersed. On the other hand, if the average diameter is too large, since the CNTs becomes hard, it is no longer possible for the CNTs to deform by following the deformation of the matrix and excellent superior durability against repeated stress cannot be exhibited. Furthermore, the average diameter of the CNTs is calculated from the exterior diameter of each carbon nanotube from a transmission electron microscope image (hereinafter, TEM) of the CNT aggregate before it is dispersed in the elastomer 30, that is, a histogram is created by measuring the diameter and the average diameter is calculated from the histogram.

It is preferable that carbon purity by analysis using a fluorescent X-ray of the CNTs 10 of the present invention is 90 wt % or more, more preferably 95 wt % or more, and more preferably 98 wt % or more. Since such high purity CNTs 10 have excellent deformability and deform by following the deformation of the elastomer 30, it is possible to exhibit excellent durability against repeated stress such as distortion. Furthermore, carbon purity indicates what percentage of the weight of the CNTs 10 is composed of carbon and the carbon purity of the CNTs 10 is obtained from an element analysis using fluorescent X-rays.

(Manufacturing Method)

In one embodiment, the elastomer structure containing CNTs 100, for example, can be manufactured as follows. A CNT/elastomer composite containing CNTs is prepared, pressure is applied to the CNT/elastomer composite at a temperature at which the elastomer is softened, the CNT/elastomer composite is pressed into a mold, and the CNT/elastomer composite is brought out from the mold. In addition, by manufacturing a CNT/elastomer composite containing CNTs, the CNT/elastomer composite material may be prepared.

Here, the mold used for molding may be a known mold such as a metal mold or resin mold as long as it is possible to heat the CNT/elastomer composite. In addition, other than compression molding, injection molding for injecting a CNT/elastomer composite into a mold may be used. When manufacturing the elastomer structure containing CNTs 100, the CNT/elastomer composite is pressed or injected into a mold using a melt press, extruder, or an injection molding machine. The mold is arranged with a recess of 10 μm or more and 100 μm or less of a predetermined shape, thereby it is possible to form a structure 130 with a fine predetermined shape on the base 110.

In addition, it is possible to use CNT rubber paste or CNT rubber pellets for the CNT/elastomer composite material.

[CNT/Elastomer Composite Material Manufacturing Process]

To reduce the water content of the CNT/elastomer composite material, it is preferable to remove the adsorbed water in the CNTs by a method such as vacuum heat drying. In addition, it is preferable to prevent adsorption and absorption of water in a solvent used for CNT dispersion and dispersion of the elastomer. To prevent water adsorption and absorption into the CNT and solvent, it is preferable to carry out a pre-dispersion process under an inert gas atmosphere with a low water content.

[Dispersion of Carbon Nanotubes]

Figure 5:
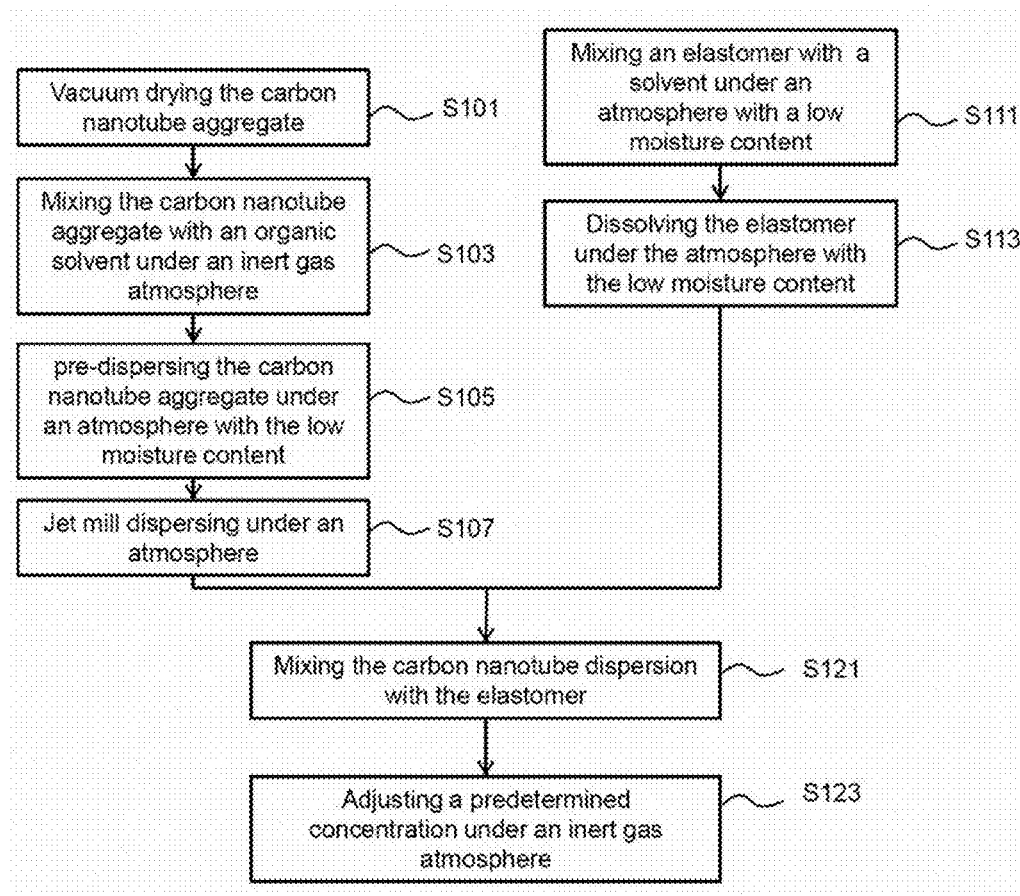
FIG. 5 is a flowchart showing a manufacturing process of a CNT/elastomer composite film related to one embodiment of the present invention.

FIG. 5 is a flowchart showing a manufacturing process of a CNT/elastomer composite film. A drying process is performed on a CNT aggregate (S101). Therefore, the drying process of the CNT aggregate is preferred in order to obtain flatness of the surface of the elastomer structure containing CNTs 100. In addition, in a state where water is adsorbed in this way, CNTs stick together due to the surface tension of water, the CNTs hardly unravel and good dispersibility in the elastomer is not obtained. Therefore, it is preferred to remove water contained in the CNT and increase dispersibility in the dispersion medium by carrying out the CNT drying process prior to the dispersing process. In a drying process, for example, it is possible to use heat drying or vacuum drying and a heat vacuum drying is preferred.

The classified CNT aggregate is mixed with an organic solvent under an inert gas atmosphere with a low water content (S103). At this time, ionic liquids may be added in order to improve dispersibility of the CNTs. Here, under an inert gas atmosphere with a low water content means an environment filled with an inert gas containing 0.1 ppm of water or less and as an inert gas such as nitrogen or argon may be used It is preferable to perform the pre-dispersing process under an inert gas atmosphere with a low water content before the next dispersion process (S105). The pre-dispersion process is a process for stirring and dispersing the aggregate of carbon nanotubes in a solvent. Although the preferred dispersion method is a jet mill, it is possible to prevent the CNT clogging in a jet mill by performing the pre-dispersing process and it is possible to improve dispersibility of the CNTs. It is preferable to use a stirrer in the pre-dispersion process.

The dispersion process is performed on a dispersion solvent of a CNT aggregate subjected to the pre-dispersing process (S107). The dispersing process on the dispersion solvent of the CNT aggregate is preferred to be performed by a method in which the CNTs are dispersed by shear stress using a jet mill. In particular, it is possible to suitably use a wet jet mill. A wet jet mill applies pressure from nozzles arranged in a sealed state within a pressure-resistant vessel to mixture within the solvent as a high-speed flow. The CNTs are dispersed by collision between counter flows in a pressure-resistant vessel, collision with the container wall, turbulence caused by the high-speed flow and a shear flow. In the case of using a nano-jet Pal (JN10, JN100, JN1000) manufactured by Jokoh Inc. as a wet jet mill for example, it is preferred that the process pressure in the dispersion process is a value within the range of 10 MPa or more and 150 MPa or less. Although the dispersion process is preferably performed under an inert gas atmosphere of with a low water content, the process may also be performed in an atmosphere where humidity is reduced due to the size of the device.

Next, the elastomer is mixed with the solvent under an inert gas atmosphere with a low water content (S111) and the elastomer is dissolved in the solvent under the low inert gas atmosphere with a low moisture content (S113). The elastomer solution prepared under a low water content environment is added to the CNT dispersion and thoroughly stirred to disperse the CNTs in the elastomer (S121).

The thoroughly mixed solution is prepared under an inert gas atmosphere with a low water content by concentrate or diluting with a solvent to a predetermined concentration (S123). Although the prepared CNT/elastomer composite material is preferably used immediately in a film forming process, in the case where it is stored, it is stored under an inert gas atmosphere with a low water content. The process of dispersing the CNTs is performed under inert conditions of water and thereby the permeation of water into the CNT/elastomer composite material is controlled and an elastomer structure containing CNTs 100 with a highly flatness surface can be formed.

[Solvent]

The solvent used to the CNT dispersion medium and dissolve the elastomer may be an organic solvent capable of dissolving the elastomer, and the solvent can be appropriately selected according to the elastomer which is used. For example, it is possible to use toluene, xylene, acetone, carbon tetrachloride and the like. In particular, methyl isobutyl ketone (hereinafter referred to as MIBK) in which many rubbers containing fluorocarbon rubber and silicone rubber are soluble, and which is a good solvent for carbon nanotubes is preferred as the solvent.

A dispersant may be added to the CNT dispersion. The dispersant helps to improve dispersibility and dispersion stabilizing ability or the like of CNTs.

[Film Formation of CNT/Elastomer Composite Material]

In the film formation of the CNT/elastomer composite material, it is important that the CNTs are uniformly distributed in the film and it is important to control the film thickness. Although it is necessary to uniformly disperse CNTs in a solvent in order to uniformly distribute the CNTs in the film, since the water content adsorbed in the CNTs lowers dispersibility, suppressing the water content is also important to the dispersion of CNTs. When the water content of the film after film formation is 5% or less, dispersion of CNTs into the solvent is considered to be sufficient for the formation of a flat film. In addition, in order to uniformly distribute the CNTs in the film, it is also necessary to prevent aggregation of the CNTs when the solvent dries during film formation.

In the case where a solution dispersed with CNTs in the elastomer is coated by a spray coating method, aggregation of the CNTs occurs before the solvent dries when the spraying amount is too large. An effective process to prevent aggregation is to uniformly apply the spray droplets to a substrate by optimizing the spray amount and to promote evaporation of the solvent by heating the substrate. For example, if the CNT concentration is 2 wt % to 12 wt %, by coating with a spray amount of 50 μL~200 μL on the silicon substrate heated to 100° C., it is possible to prepare a CNT/elastomer composite film with uniformly dispersed CNTs.

In the spray coating method it is possible to form the CNT/elastomer composite film on an arbitrary substrate and it is possible to minimize the effect of wettability between the substrate and the solvent by adjusting the spray pressure and spray amount. For example, it is possible to obtain a CNT/elastomer composite film on a substrate such as silicon, sapphire, polyimide and a dimethylpolysiloxane (PDMS).

Since the spray coating method can control film thickness by the number of times sprayed, it is suitable for thickness control of a thin film of 50 μm or less. In addition, the accuracy of film thickness control is dependent on the coating amount in the spray coat and the solvent concentration of the CNT elastomer paste. In the case of application using a spin coating method, since there is a difference in the centrifugal force due to the difference in mass of the CNTs and the elastomer, separation of the CNTs and the elastomer easily occurs and it is difficult to uniformly disperse the CNTs in a film. In addition, in the spin coating method it is difficult to suppress the influence of wettability between a substrate and a solvent.

In the case of application using a casting method, although the solvent is dried in a container such as a beaker or dish, it is possible to make the distribution of the CNTs uniform by rotating the container, and it is possible to obtain a uniform film thickness distribution. The film thickness in the film formation by a casting method is controlled by the amount of solvent.

When manufacturing a CNT/elastomer composite, it is also possible to use ionic liquids in order to improve dispersibility of the CNTs in the elastomer. In the present embodiment, although it is possible to use known ionic liquids, for example cations represented by the following formula (I) to (IV) (preferably imidazolium ion, quaternary ammonium ion) and anions ($X^-$) disclosed by the inventors in Japanese Laid Open Patent No. 2010-097794 can also be used.

[Formula 1]

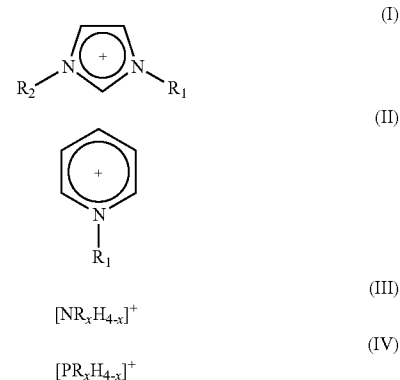

In (I) to (IV) in the above formula, $R_1$ represents an alkyl group including a linear chain or branch with a carbon number of 1 to 12 or an alkyl group including a linear chain or branch including an ether bond and a total number of 3 to 12 of carbon and oxygen, $R_2$ in formula (I) represents an alkyl group including a linear or branch having a carbon number of 1 to 4 or a hydrogen atom. In the formula (I), $R_1$ and $R_2$ are preferred not to be the same. In formula (III) and (IV), x is an integer of 1 to 4.

Furthermore, in addition to the components described above, for example, an ion conductive agent (surfactant, an ammonium salt, an inorganic salt), plasticizers, oils, cross-linking agents, crosslinking accelerators, anti-aging agents, flame retardants and coloring agents may also be used as appropriate in the CNT/elastomer composite film.

Figure 6:
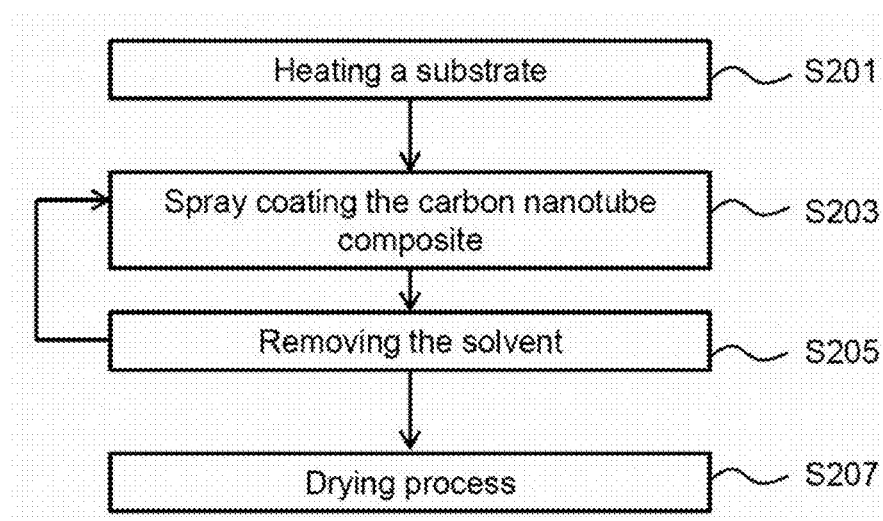
FIG. 6 is a flow diagram showing a step of forming the CNT/elastomer composite film by a spray coating method related to an embodiment of the present invention.

In the case where a film is formed by spray coating, it is possible to form the film using the following steps for example. FIG. 6 is a flow diagram showing the process of forming a CNT/elastomer composite film using a spray coating method. A substrate to be spray coated is heated to a temperature at which a solvent is volatilized (S201). The prepared CNT/elastomer composite is spray coated on a heated substrate surface (S203). The solvent in the CNT/elastomer composite material is removed by heat drying and a film is formed (S205). The spray coating process and heat drying process are repeated until the desired thickness is obtained. Although the film forming processes are preferably performed under an inert gas atmosphere with a low water content, the processes may be performed at a lower controlled humidity atmosphere due to the size of the device. In the case where a film is formed in an atmosphere, the CNT/elastomer composite film is preferred to be further heat dried (S207). In the film forming process, it is important to remove any water so as not to be mixed with the film. Furthermore, the substrate to be used in the film formation process may be one that is commonly used in electronic devices such as silicon, sapphire, polyimide, and dimethyl polysiloxane (PDMS).

[Molding of Elastomer Structure Containing CNTs]

Figure 7:
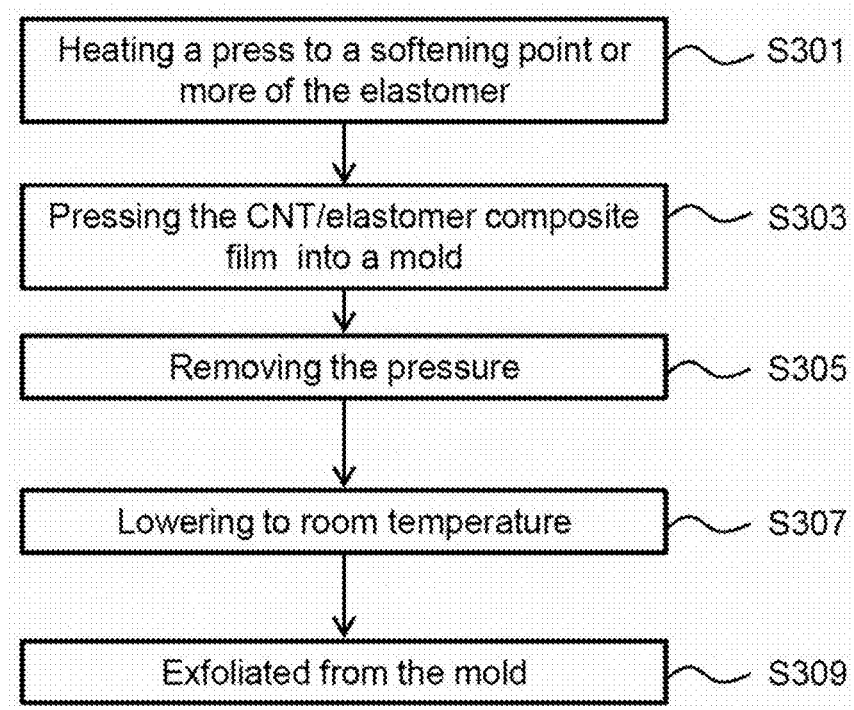
FIG. 7 is a flow diagram showing a molding process of the elastomer structure containing CNTs related to one embodiment of the present invention.

It is possible to mold an elastomer structure containing CNTs having a fine structure by the molding method described above using a CNT/elastomer composite material. As an example, an imprint process for compression molding a CNT/elastomer composite film is explained. FIG. 7 is a flowchart showing a molding process of an elastomer structure containing CNTs according to the present invention.

A press comprising a heating mechanism is heated to the softening point or more of the elastomer (S301). The CNT/elastomer composite film is pressed into a mold arranged with a recess having a predetermined shape using the press machine (S303). In this way, an elastomer which is a matrix of the CNT/elastomer composite film is softened and is formed by being transferred to the shape of the mold. In this state, CNT/elastomer composite film is held for a predetermined period of time at a given temperature. Following this, the pressure of the press is removed (S305). The temperature is lowered to room temperature to solidify the elastomer (S307). The elastomer structure containing CNTs is exfoliated from the mold (S309).

In this way, it is possible to manufacture an elastomer structure containing CNTs arranged with a shape defined by fine dimensions.

EXAMPLES

Characteristics of CNTs Manufactured in the Examples

Although the characteristics of a CNT aggregate depend on the details of the manufacturing conditions, in the manufacturing conditions of Example 1, a length was 100 μm and an average diameter was 3.0 nm as typical values.

[Purity of a Carbon Nanotube Aggregate]

The carbon purity of a CNT aggregate was determined by an element analysis using fluorescent X-rays. The CNT aggregate which was peeled from the substrate was analyzed using fluorescent X-rays and the weight percent of carbon was 99.98%, the weight percent of iron was 0.013% and other elements were not measured. From this result, the carbon purity was measured to be 99.98%.

[Dispersion of CNTs]

The orientated CNT aggregate is sucked and peeled from the substrate using a vacuum pump and a CNT aggregate adhered to the filter is gathered. At this time, the oriented CNT aggregate is classified to obtain a CNT aggregate bulk.

100 mg of the classified CNT aggregate was accurately weighed and put into a 100 ml flask (three neck: vacuum use, for temperature regulation use) and held for 24 hours after reaching 200° C. under a vacuum and dried. After drying is completed, the aggregate is left in a heated and vacuum treated state, 20 ml of a dispersion media MIBK (methyl isobutyl ketone) (manufactured by Sigma-Aldrich Japan) was injected and the CNT aggregate was prevented from being exposed to the atmosphere (drying process).

Furthermore, MIBK (manufactured by Sigma-Aldrich Japan) and an ionic liquid were added to make 300 ml under a condition of a water content of 0.1 ppm or less and an argon atmosphere. A stirrer was inserted to the beaker, the beaker was sealed with aluminum foil and was stirred at room temperature for 24 hours using the stirrer at 600 RPM so that MIBK did not volatilize.

In the dispersion process, the CNT aggregate is dispersed in MIBK by passing through a 200 μm flow passage at a pressure of 60 MPa using a wet jet mill (nano-jet PAL (registered trademark) JN10 manufactured by Jokoh Inc), and a CNT dispersion was obtained with a weight concentration of 0.033 wt %. The dispersion process was performed in an atmosphere.

[CNT Rubber Paste Manufacturing Process]

In the present example, fluorocarbon rubber (Daiel-G912 manufactured by Daikin Industries, Ltd.) was used as the elastomer. The fluorocarbon rubber was mixed with MIBK (manufactured by Sigma-Aldrich Japan Inc) under an argon atmosphere and was dissolved in two days. In the case where the total mass of the CNT/fluorocarbon rubber composite material was 100 wt %, 200 ml of the CNT dispersion solvent was added to 100 ml of the fluorocarbon rubber solution so that the CNT content became 2% by weight, stirred for 16 hours at room temperature and concentrated until the total volume was about 300 ml using a stirrer at about 300 rpm. The obtained CNT/fluorocarbon rubber composite material includes 200 mg of single-phase CNT, 300 cc of MIBK and 9800 mg of fluorocarbon rubber.

(Process for Forming CNT/Fluorocarbon Rubber Composite Film)

50 to 200 μl of the sufficiently mixed solution was sprayed onto a silicon substrate heated to 100° C. The solvent was in the CNT/fluorocarbon rubber composite material was removed by heat drying and a film was formed. A CNT/fluorocarbon rubber composite film with a film thickness of 15 μm was obtained by repeating the spray coating and heat drying 40 times. Following this, the film was further dried for 5 hours at 150° C.

[Molding Process of the Elastomer Structure Containing CNTs]

A mold press attached with a mold was heated to 150° C. The CNT/fluorocarbon rubber composite film was pressed by the mold and a load of 1 MPa was applied while heating to 150° C. In this state, the film was held for 10 to 20 minutes and then the pressure was released. The film was allowed to cool to room temperature then was peeled off from the mold to obtain the elastomer structure containing CNTs of Example 1.

Figure 8A:
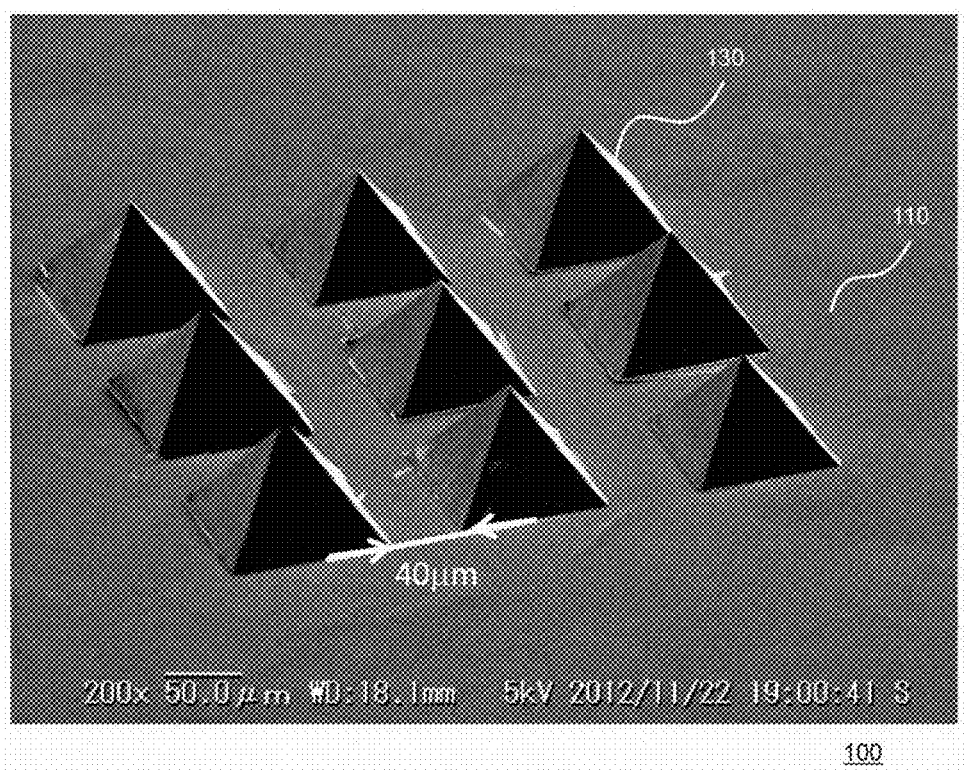
FIG. 8A is an SEM image of the elastomer structure containing CNTs related to one example of the present invention.
Figure 8B:
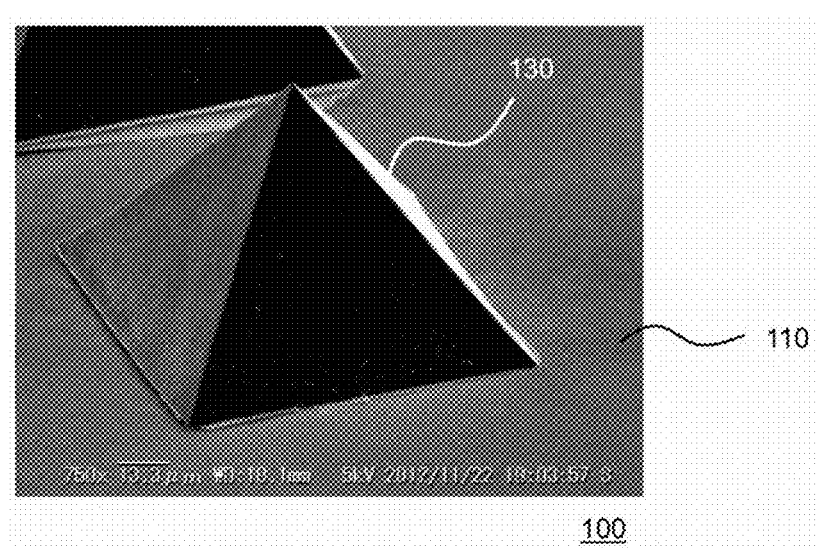
FIG. 8B is an enlarged view of FIG. 8A.

FIG. 8A is a SEM image of the elastomer structure containing CNTs of Example 1 and FIG. 8B is an enlarged view of FIG. 8A. As is clear from FIG. 8, in the present example, the elastomer structure containing CNTs was accurately formed in the base 110 with a fine pyramidal structure 130 at 40 μm intervals.

Figure 9A:
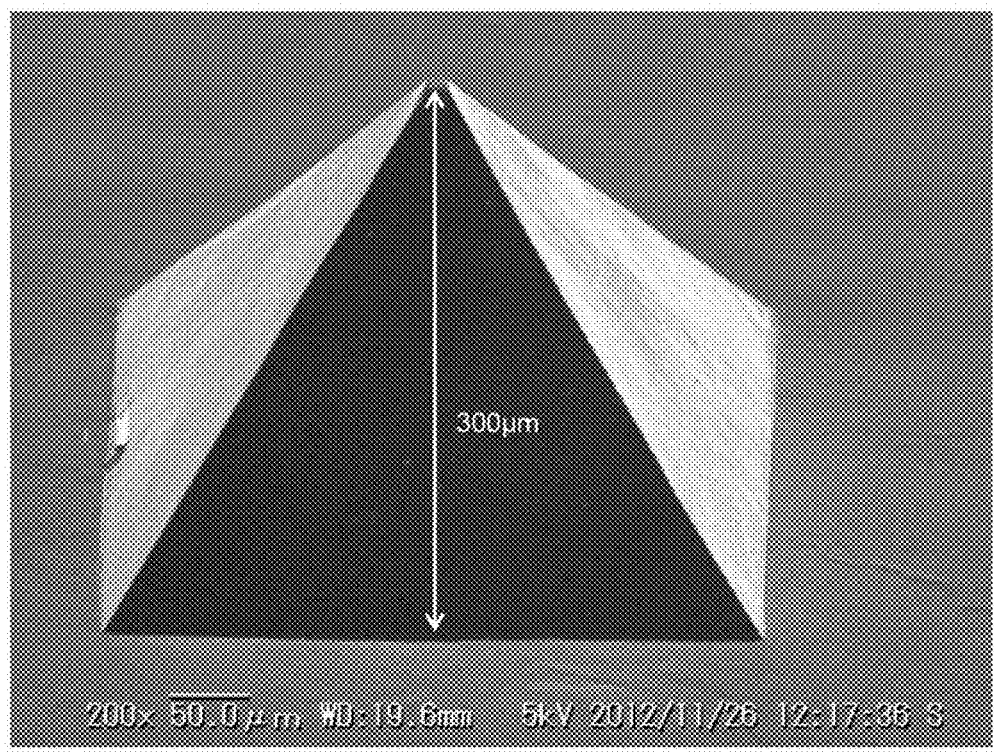
FIG. 9A is an SEM image of the elastomer structure containing CNTs with an aspect ratio of 15 related to one example of the present invention.
Figure 9B:
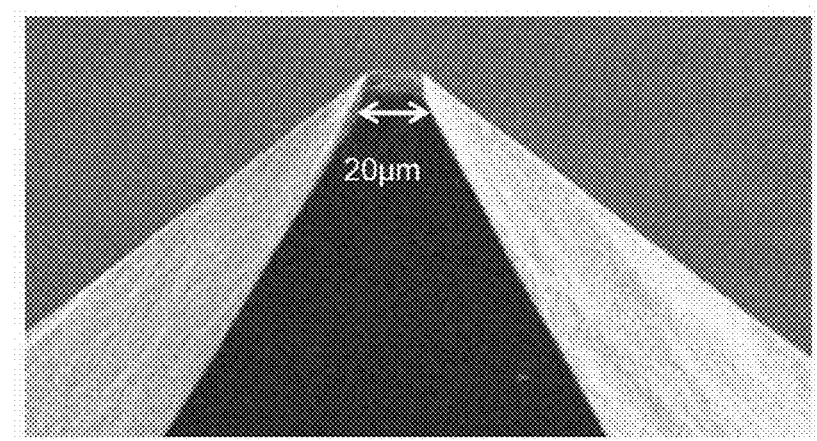
FIG. 9B is an enlarged view of the top of the elastomer structure containing CNTs.

FIG. 9A is a SEM image of an elastomer structure containing CNTs an aspect ratio of 15 of Example 1 and FIG. 9B is an enlarged view of the top of the elastomer structure containing CNTs. As is clear from FIG. 9, in the present example, it is possible to form structures with a high aspect ratio. A Fine structure with such a high aspect ratio could not be achieved conventionally in the molding of the material of the rubber.

Figure 10A:
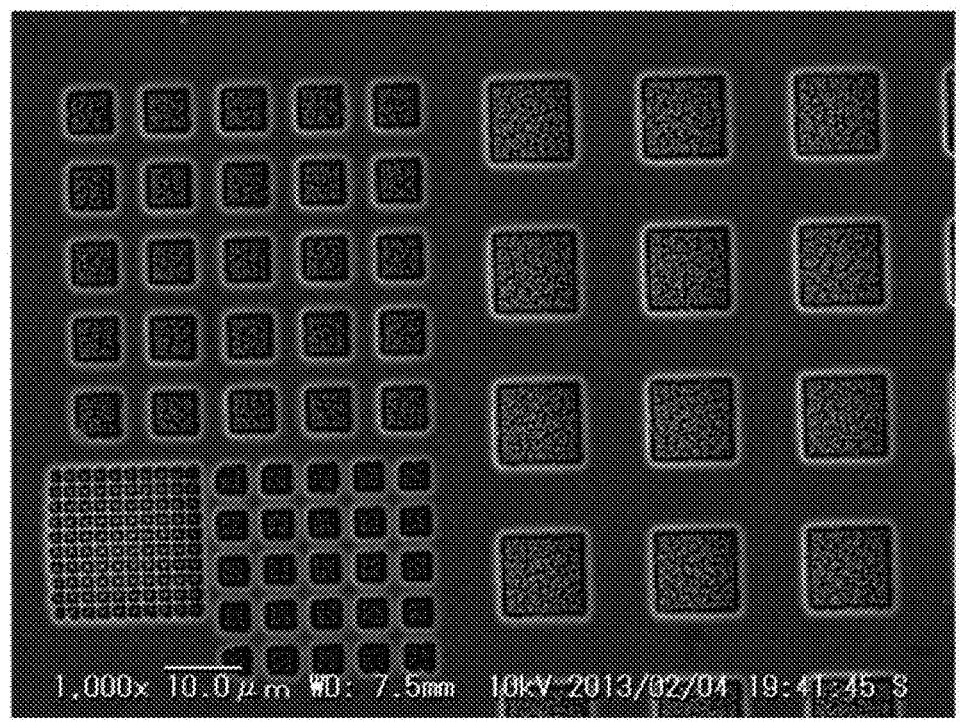
FIG. 10A is a SEM image of a silicon substrate formed with rectangular patterns related to one example of the present invention.
Figure 10B:
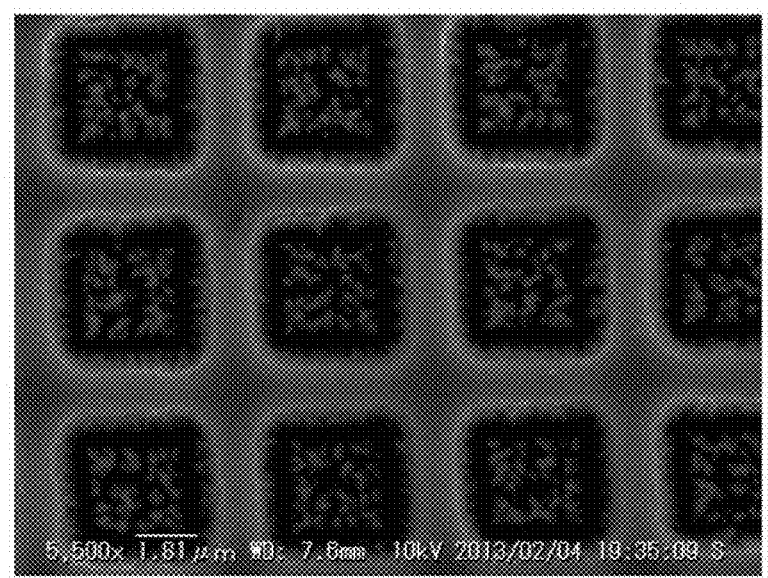
FIG. 10B is an enlarged view of FIG. 10A.
Figure 11:
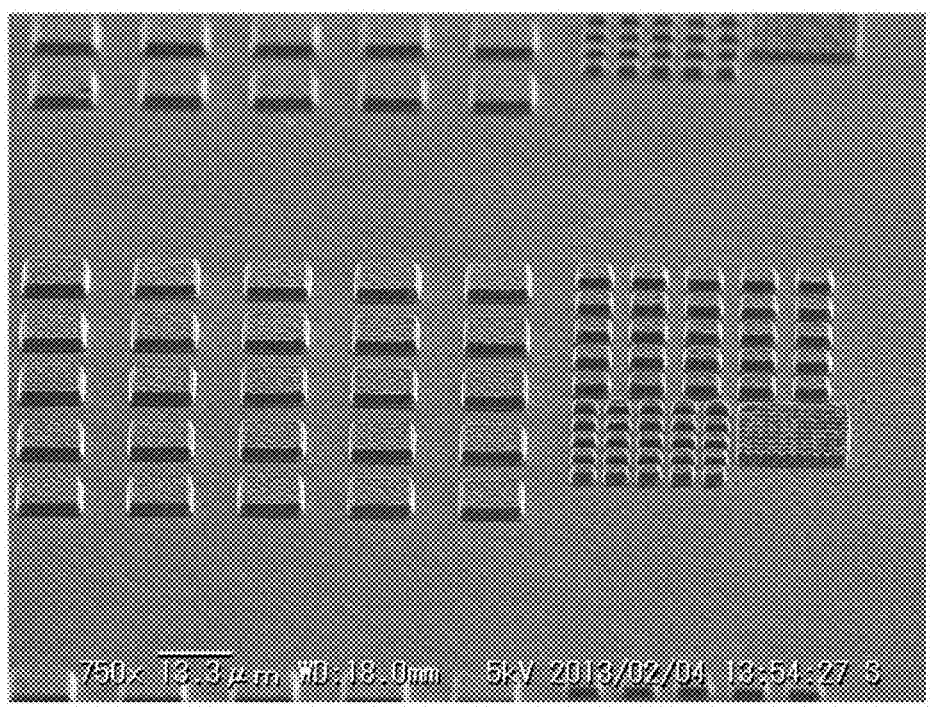
FIG. 11 is a SEM image of an elastomer structure containing CNTs related to one embodiment of the present invention molded by using the mold in FIG. 10.

A number of patterns of rectangular shapes with different sizes were formed on a silicon substrate to form an elastomer structure containing CNTs. FIG. 10A is a SEM image of a mold made of a silicon substrate formed with rectangular patterns and FIG. 10B is an enlarged view of FIG. 10A. FIG. 11 is a SEM image of the elastomer structure containing CNTs of the present example molded using the mold of FIG. 10. In the present example, it was clear that an elastomer structure containing CNTs transferred with high accuracy was obtained as far as the unevenness in the pattern surface of the mold.

Figure 12A:
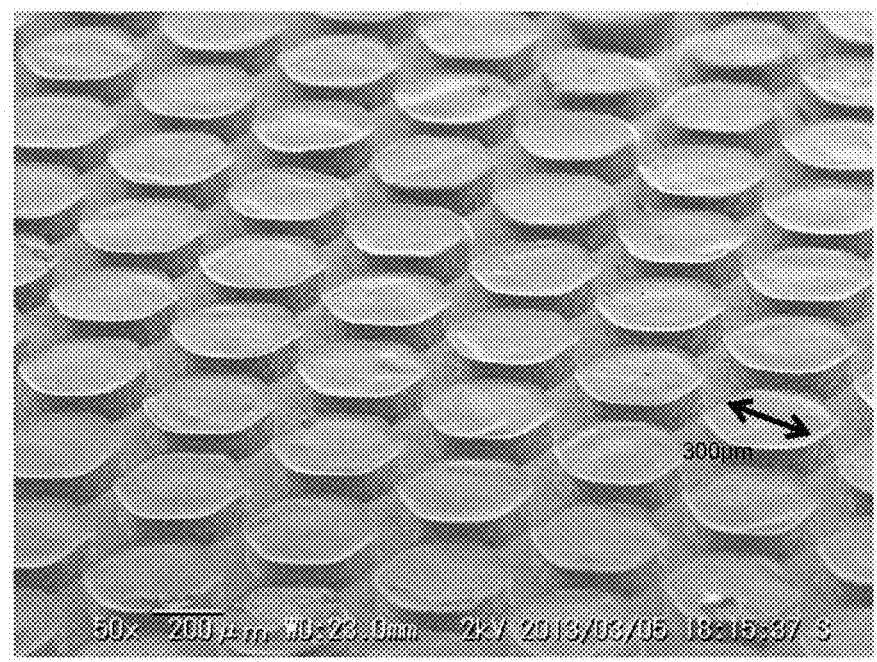
FIG. 12A is an elastomer structure containing CNTs related to one example of the present invention molded by using a metal mask.
Figure 12B:
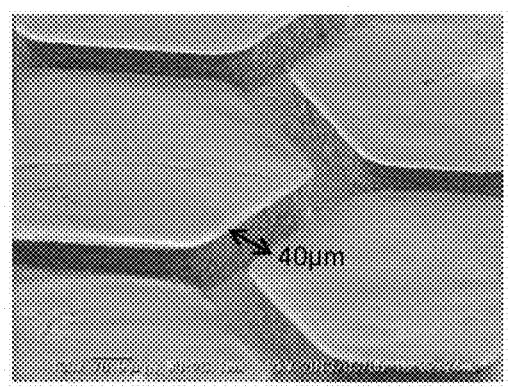
FIG. 12B is an enlarged view of FIG. 12A.
Figure 12C:
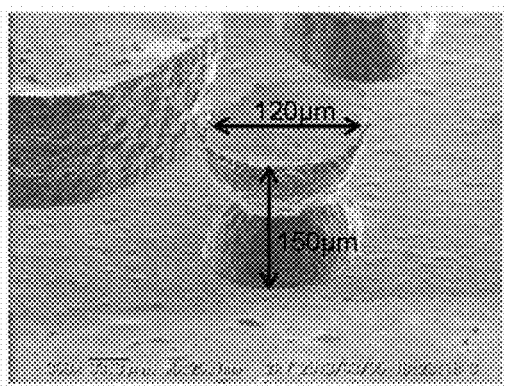
FIG. 12C is enlarged view of FIG. 12A.

In addition to a silicon substrate an elastomer structure containing CNTs was formed using a metal mask as the mold. FIG. 12A is a SEM image of the elastomer structure containing CNTs molded using a metal mask and FIG. 12B and FIG. 12C are enlarged views of FIG. 12A. In the present example, it was possible to accurately form an elastomer structure containing CNTs with a width of 300 μm at intervals of 40 μm even when the material of the mold was changed. In addition, as is shown in FIG. 12C, in this example, by supporting the rubber with flexibility with CNTs, even a structure where the center part has a recess shape can be peeled from the mold and its structure maintained.

[Expansion Test]

Figure 13A:
FIG. 13A shows an appearance of allowing the elastomer structure containing CNTs related to one example of the present invention to extend in two directions to provide distortions.
Figure 13B:
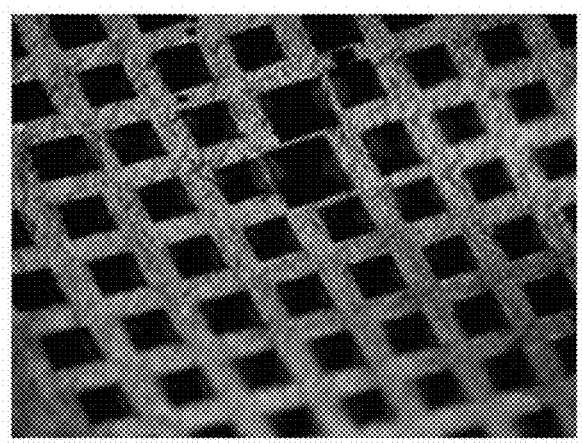
FIG. 13B is an enlarged view.

The state of the structure of the obtained elastomer structure containing CNTs was evaluated by applying strain. FIG. 13A shows a state in which the elastomer structure containing CNTs was applied with strain to expand the structure in two directions and FIG. 13B is an enlarged view of FIG. 13A. The elastomer structure containing CNTs is provided with flexibility from the characteristics of the contained elastomer and the fine molded elastomer structure containing CNTs is deformed following the expansion.

Figure 14A:
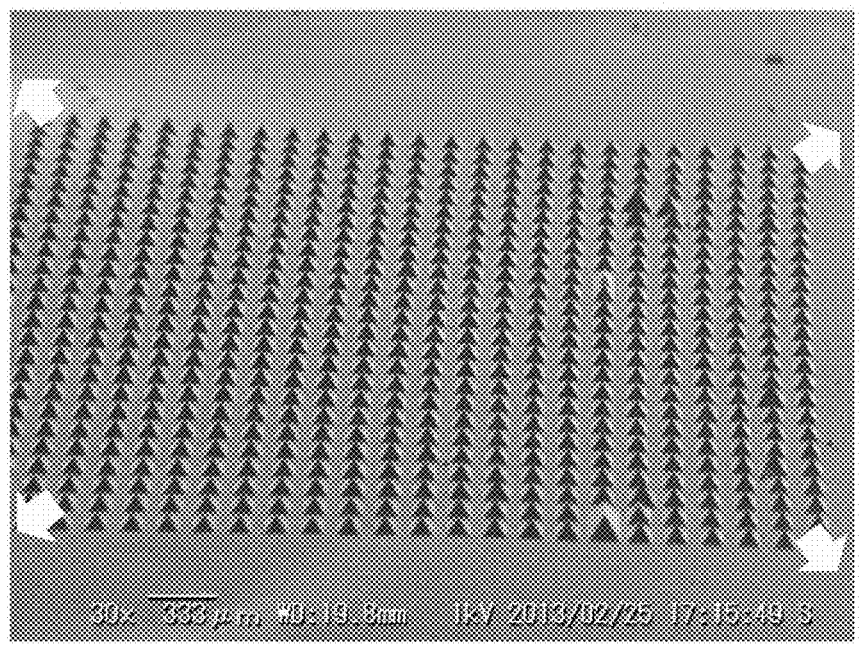
FIG. 14A is a SEM image showing an appearance of extending in 4 directions to provide distortions related to one example of the present invention.
Figure 14B:
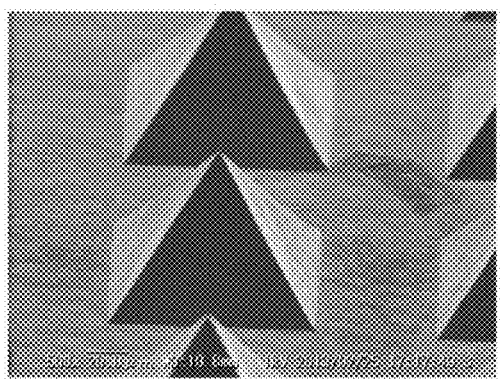
FIG. 14B is an enlarged view of FIG. 14A.
Figure 14C:
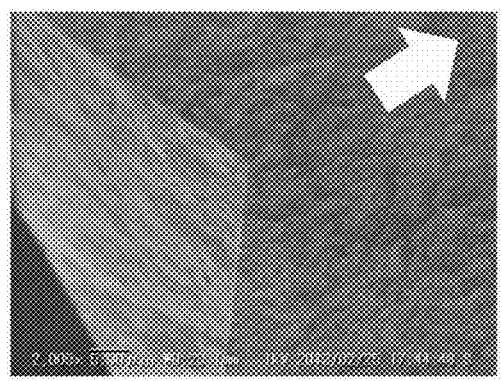
FIG. 14C is a further enlarged view of a fine structure.

FIG. 14A is a SEM image showing a state in which the structure is extended in four directions by applying strain, FIG. 14B is an enlarged view of FIG. 14A and FIG. 14C is a further expanded view of a fine structure. The elastomer structure containing CNTs is provided with flexibility by the characteristics of the contained elastomer and the fine molded elastomer structure containing CNTs is deformed following the expansion. In addition, as shown in FIG. 14C, it can be seen that CNTs contained in the fine elastomer structure containing CNTs are deformed to follow the deformation of the elastomer structure containing CNTs. Since the CNT aggregate contained in the elastomer structure containing CNTs has a mesh shaped structure, this demonstrates that it is possible follow the deformation of the elastomer structure containing CNTs.

Figure 15:
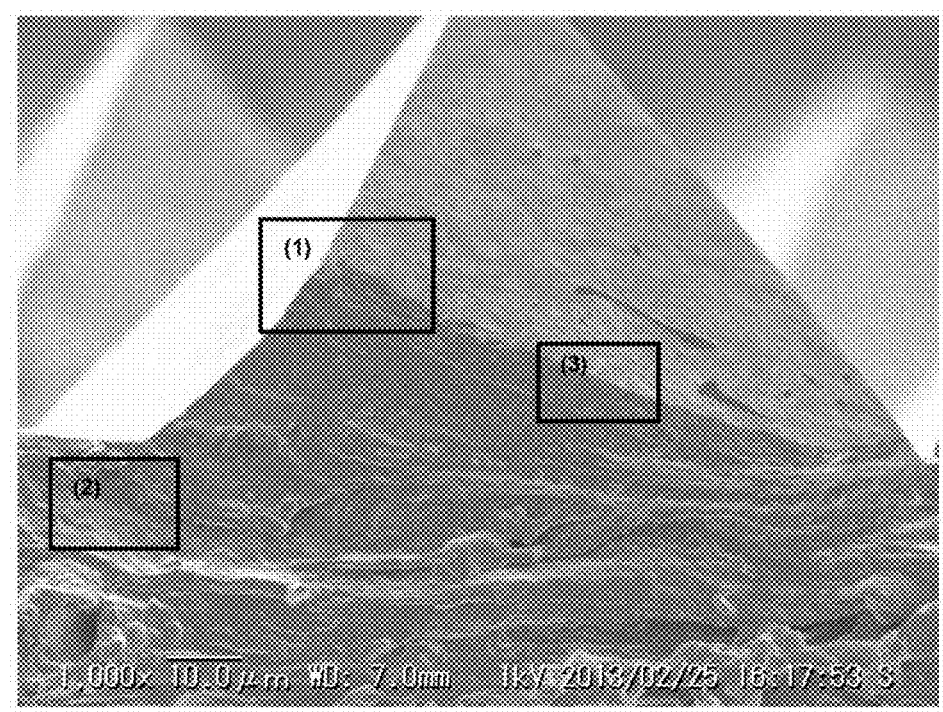
FIG. 15 is a SEM image showing a cross-section of an elastomer structure containing CNTs related to one example of the present invention.
Figure 16:
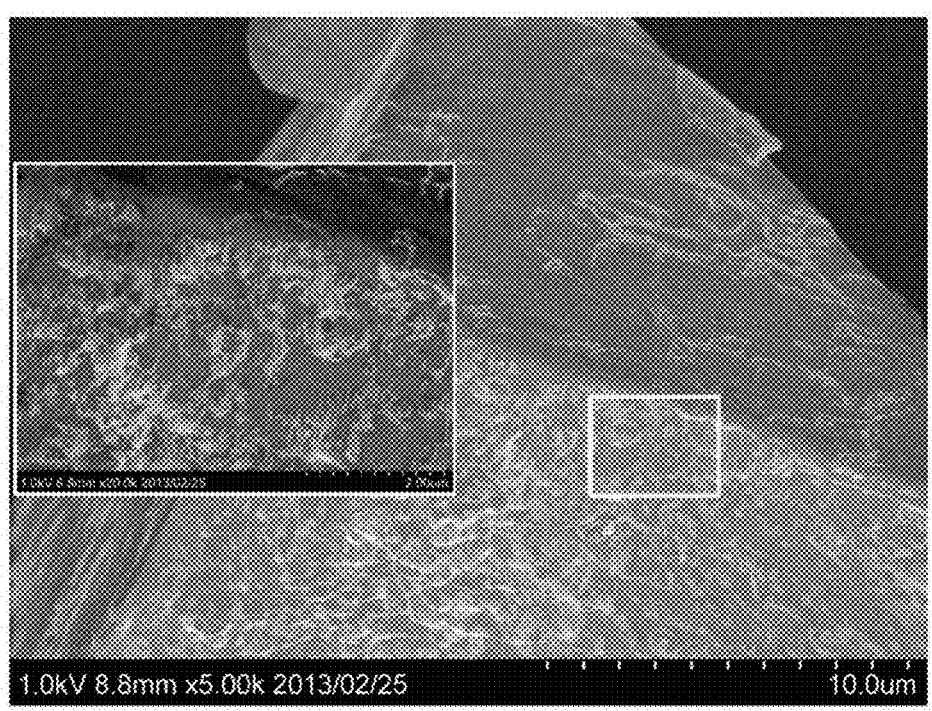
FIG. 16 is an enlarged view of a part (1) of the elastomer structure containing CNTs related to one example of the present invention in FIG. 15.
Figure 17:
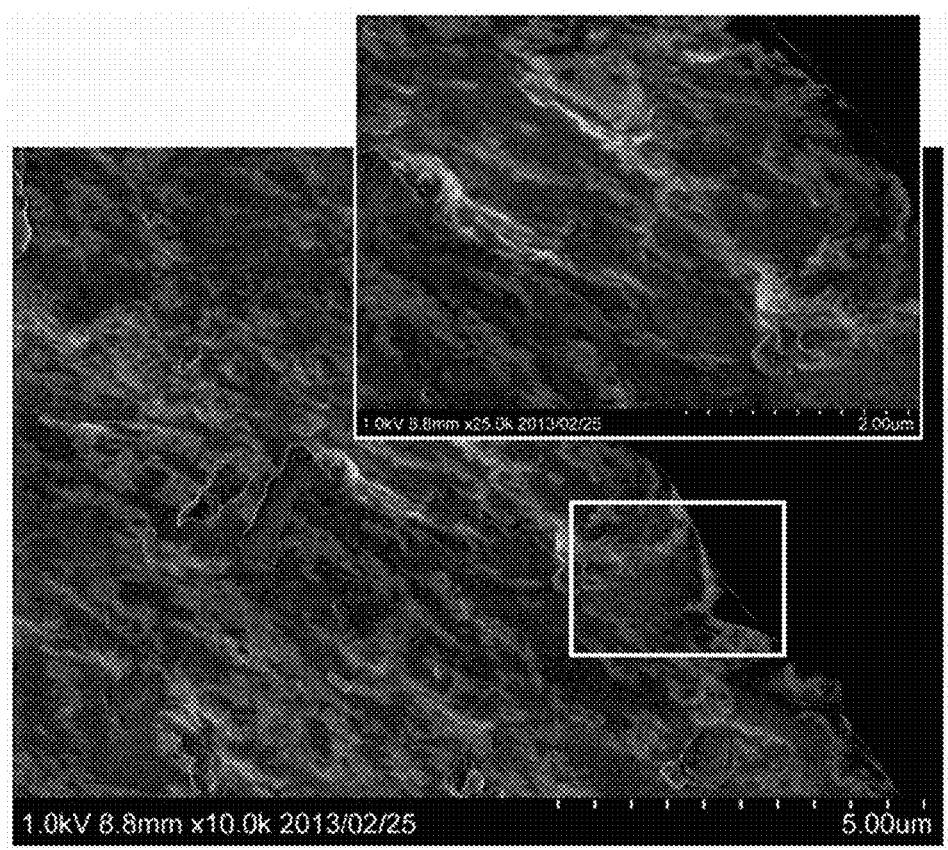
FIG. 17 is an enlarged view of a part (2) of the elastomer structure containing CNTs related to one example of the present invention in FIG. 15.
Figure 18:
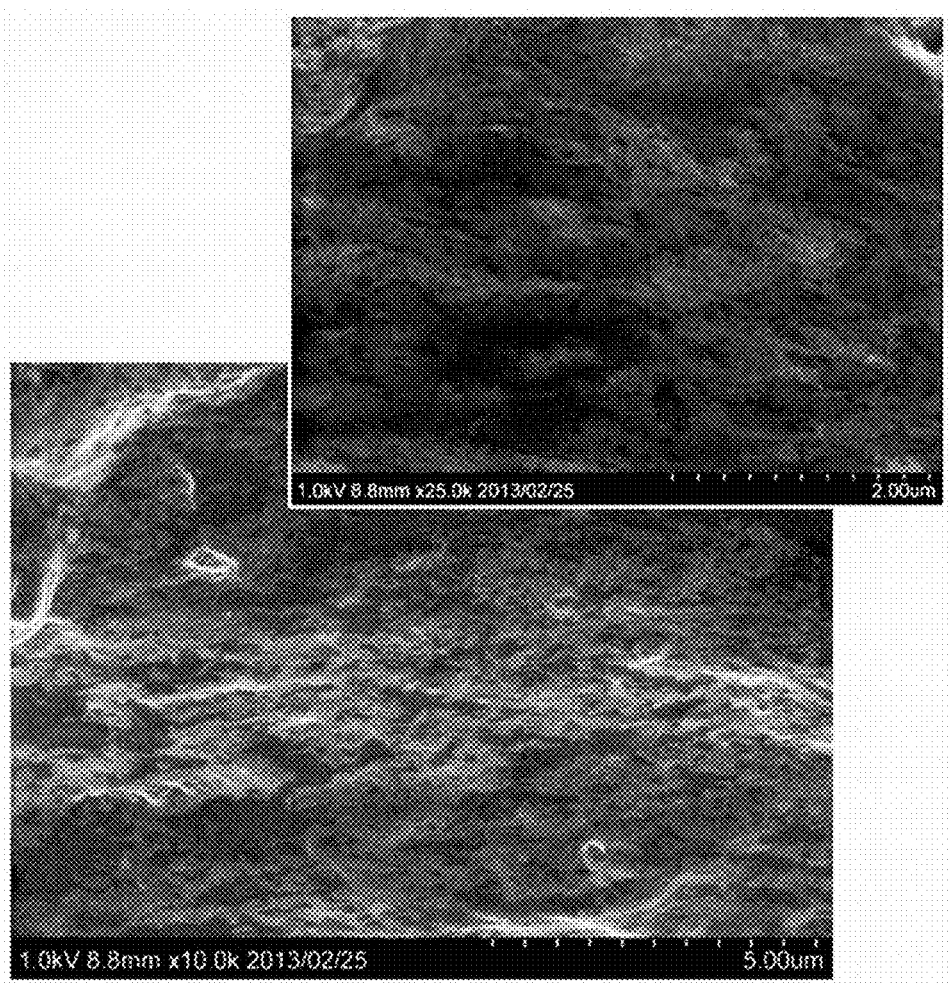
FIG. 18 is an enlarged view of a part (3) of the elastomer structure containing CNTs related to one example of the present invention in FIG. 1

Next, the structure of the CNT aggregate included in the elastomer structure containing CNTs was evaluated. FIG. 15 is a SEM image showing a cross-section of an elastomer structure containing CNTs. FIG. 16 is an enlarged view of a part (1) in FIG. 15, FIG. 17 is an enlarged view of a part (2) in FIG. 15, and FIG. 18 is an enlarged view of a part (3) in FIG. 15. As is clear from FIGS. 16 to 18, in the interior of the CNT-containing elastomer structure of the present example, CNTs are dispersed unevenly and locally, however, CNTs are dispersed uniformly as a whole. This dispersion situation was the same as in FIGS. 16 and 17 indicating the fine structure situation and in FIG. 18 showing the surface layer of the base.

Example 2

Figure 19A:
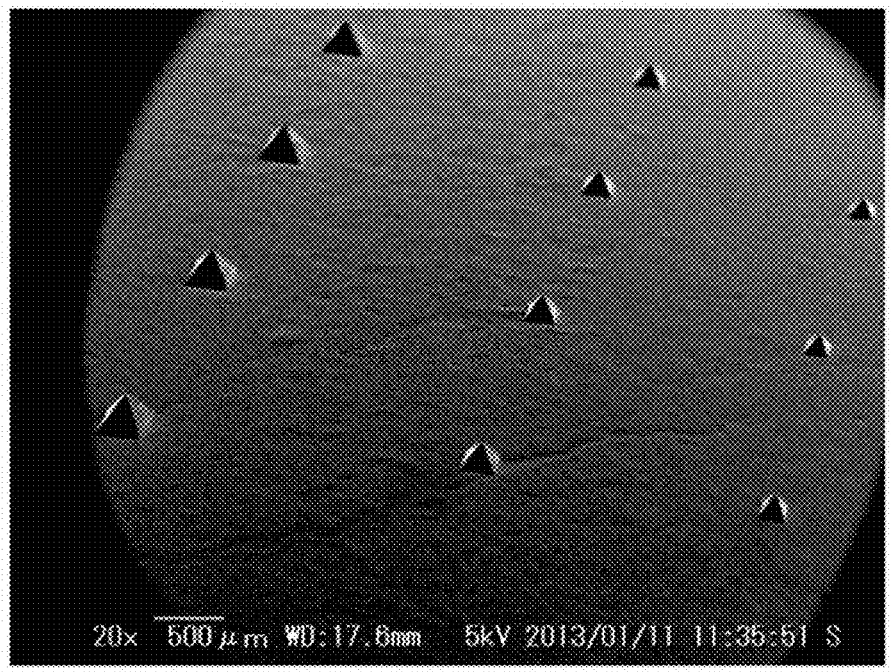
FIG. 19A is a SEM image of an elastomer structure containing CNTs related to one example of the present invention.
Figure 19B:
FIG. 19B is a SEM image of an elastomer structure containing CNTs related to one example of the present invention.

An elastomer structure containing CNTs was molded with a CNT content of 1 wt % using the same manufacturing method as in Example 1 as Example 2. FIG. 19A and FIG. 19B show that a pyramid mold structure of different sizes was precisely obtained in the same manner as in Example 1 even with just a CNT content of 1% by weight.

Example 3

Figure 20A:
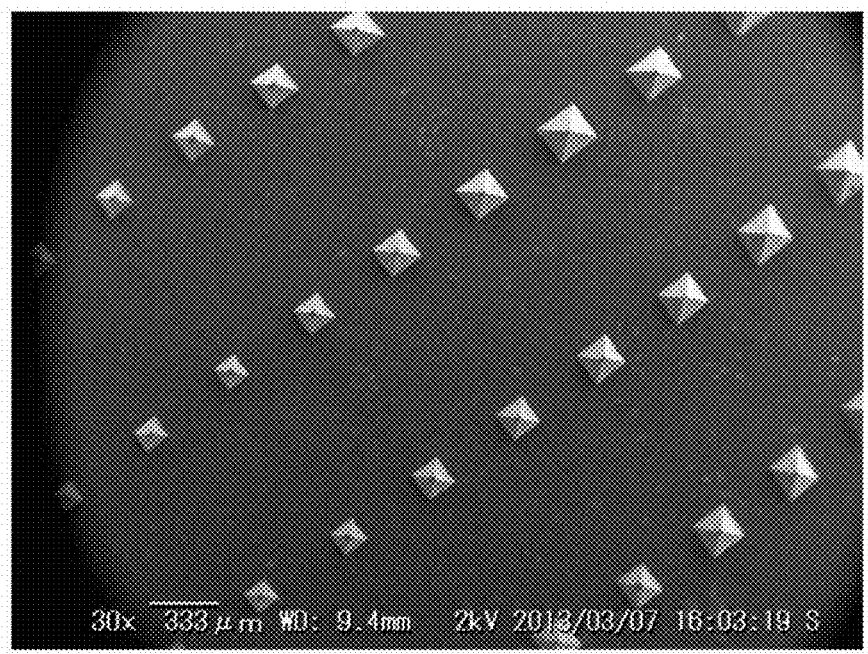
FIG. 20A is a SEM image of an elastomer structure containing CNTs related to one example of the present invention.
Figure 20B:
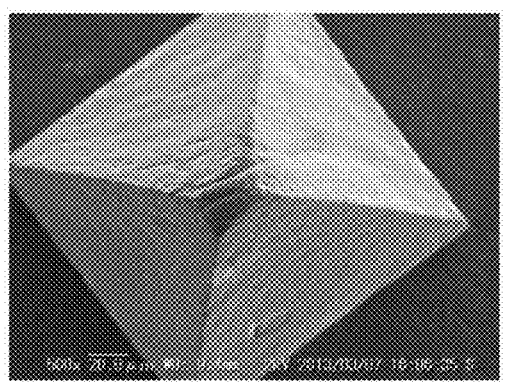
FIG. 20B is an enlarged view of a different structure having the shape in FIG. 20A.
Figure 20C:
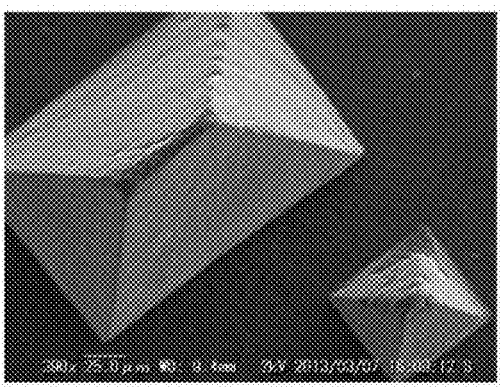
FIG. 20C is an enlarged view of a different structure having the shape in FIG. 20A.

The elastomer was changed to a nitrile rubber (NBR) and an elastomer structure containing CNTs was molded using the same manufacturing method as in Example 1. The contained amount of the nitrile rubber was 3 wt %. FIG. 20A is a SEM image of an elastomer structure containing CNTs, FIG. 20B and FIG. 20C are enlarged views of structures having a different shape in FIG. 20A. As is clear from FIG. 20, an elastomer structure containing CNTs can be accurately molded even when the type of elastomer is changed.

Comparative Example

Figure 21:
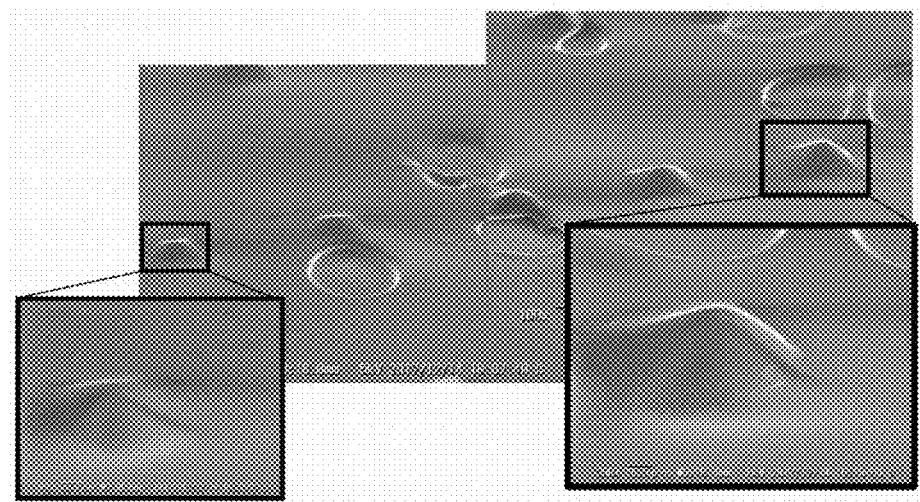
FIG. 21 is a SEM image of the structure of the comparative example.

A structure was molded using only fluorocarbon rubber as the elastomer without the addition of CNTs as a comparative example. FIG. 21 is a SEM image of the structure of the comparative example. As is clear from FIG. 21, it is not possible to mold a fine structure using the elastomer alone.

Furthermore, the present invention is not limited to the examples described above, and in the elastomer structure containing carbon nanotubes, the water content of the elastomer structure containing carbon nanotubes may be 5% or less. In addition, the elastomer structure containing carbon nanotubes may contain carbon nanotubes of 0.5% by weight or more.

In addition, in the elastomer structure containing carbon nanotubes, the elastomer structure containing carbon nanotubes may be formed on the surface of the substrate, and may be formed to project and/or depressed onto the substrate surface. In addition, the elastomer structure containing carbon nanotubes may be arranged on the substrate.

The elastomer structure containing carbon nanotubes may be elastically deformed and may be elastically deformed with a 10% elongation.

In the elastomer structure containing carbon nanotubes, arithmetic average roughness of the surface of the elastomer structure containing carbon nanotubes may be 10 μm or less.

In the elastomer structure containing carbon nanotubes, the arithmetic average roughness of the surface of the elastomer structure containing carbon nanotubes may be less than the dimensions defined by any of the dimensions described above.

In the elastomer structure containing carbon nanotubes, the defined shape of the elastomer structure containing carbon nanotubes may be defined by the shape of the mold.

In the method of manufacturing the elastomer structure containing carbon nanotubes, the carbon nanotube/elastomer composite may be pressed or injected into the mold using a melt press, extruder or an injection molding machine. In addition, the carbon nanotube/elastomer composite material may be a carbon nanotube rubber paste or a carbon nanotube rubber pellet.

According to the present invention, it is possible to realize an elastomer structure containing carbon nanotubes and a manufacturing method thereof arranged with a shaped defined by fine dimensions as defined by the shape of a mold.

The invention claimed is:

1. An elastomer structure containing carbon nanotubes comprising:
   a base; and
   a structure having a shape defined by dimensions of 500 μm or less on the base, wherein
- the base and structure are constituted of an elastomer composite material containing carbon nanotubes including an elastomer, the elastomer composite material containing carbon nanotubes includes a mesh shaped carbon nanotube aggregate containing 0.5 wt % or more of carbon nanotubes dispersed in the elastomer, and
- the carbon nanotubes included in the mesh shaped carbon nanotube aggregate are embedded in an area having a thickness up to 100 μm from a surface of the base and a surface of the structure.

2. A method of manufacturing the elastomer structure containing carbon nanotubes according to claim 1, the method comprising:
- preparing a carbon nanotube/elastomer material containing carbon nanotubes;
- adding pressure to a carbon nanotube/elastomer composite material at a temperature softening an elastomer and pressing or injecting the carbon nanotube/elastomer composite material into a mold; and
- bringing out the carbon nanotube/elastomer composite material from the mold.

3. The method of manufacturing the elastomer structure containing carbon nanotubes according to claim 2, wherein the carbon nanotube/elastomer composite material is prepared by manufacturing the carbon nanotube/elastomer containing carbon nanotubes.

4. The method of manufacturing the elastomer structure containing carbon nanotubes according to claim 2, wherein the mold is arranged with a recessed part of a certain shape of 10 μm or more and 100 μm or less.

5. The elastomer structure containing carbon nanotubes according to claim 1, wherein the base has a surface arithmetic average roughness of 10 μm or less.

6. The elastomer structure containing carbon nanotubes according to claim 1, wherein the structure is arranged on the base.

7. The elastomer structure containing carbon nanotubes according to claim 1, wherein a pore diameter a differential pore volume measured using a mercury intrusion method in the pore diameter range of 0.002 μm or more and 10.00 μm or less is maximum within a range of 0.02 μm or more and 2.0 μm or less.

8. The elastomer structure containing carbon nanotubes according to claim 7, wherein a pore volume is 0.5 mL/g or more and 20 mL/g or less at a pore diameter in which the differential pore volume is maximum.

9. The elastomer structure containing carbon nanotubes according to claim 1, wherein the elastomer structure containing carbon nanotubes has a shape maintaining property.

* * * * *